(12) United States Patent
Tanaka

(10) Patent No.: US 11,144,193 B2
(45) Date of Patent: Oct. 12, 2021

(54) INPUT DEVICE AND INPUT METHOD

(71) Applicant: PANASONIC INTELLECTUAL PROPERTY MANAGEMENT CO., LTD., Osaka (JP)

(72) Inventor: Tsuyoshi Tanaka, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/561,964

(22) Filed: Sep. 5, 2019

(65) Prior Publication Data

US 2019/0391736 A1 Dec. 26, 2019

Related U.S. Application Data

(63) Continuation of application No. PCT/JP2018/037204, filed on Oct. 4, 2018.

(30) Foreign Application Priority Data

Dec. 8, 2017 (JP) .............................. JP2017-235934

(51) Int. Cl.
*G06F 3/0488* (2013.01)
*G06F 3/041* (2006.01)
(Continued)

(52) U.S. Cl.
CPC .......... *G06F 3/04883* (2013.01); *G06F 3/016* (2013.01); *G06F 3/041* (2013.01);
(Continued)

(58) Field of Classification Search
CPC ...... G06F 3/04883; G06F 3/016; G06F 3/041; G06F 3/04817; G06F 3/0482; G06F 2203/04808; G06F 2203/04105
See application file for complete search history.

(56) References Cited

U.S. PATENT DOCUMENTS 7,076,734 B2 * 7/2006 Wolff ................. H04N 5/44543
715/720
8,933,910 B2 * 1/2015 Ikeda ...................... G06F 3/044
345/174

(Continued)

FOREIGN PATENT DOCUMENTS

JP 2004-246920 9/2004

OTHER PUBLICATIONS

Jung et al.: Effect of Tactile Display in Visually Guiding Input Device, 2006 IEEE/RSJ International Conference on Intelligent Robots and Systems, pp. 5046-5051, Oct. 9-15, 2006, Beijing, China. (Year: 2006).*

(Continued)

*Primary Examiner* — Daeho D Song
(74) *Attorney, Agent, or Firm* — Greenblum & Bernstein, P.L.C.

(57) ABSTRACT

This input device provides an input for operating a user interface (UI) including a first menu and displayed by a display disposed in a vehicle, and includes: a first touch sensor which receives a gesture made as a touch by a user; and a controller which causes the display to display, as the first menu, a plurality of first icons aligned in a first direction. The controller causes the display to display a first gauge bar extending from a first reference position as an origin in the first direction and having a length corresponding to the length of a first gesture input to the first touch sensor, and selects a first icon disposed in a first region where an end portion of the first gauge bar displayed on the display is located when an input indicating confirmation is provided among a plurality of first regions seamlessly aligned.

19 Claims, 16 Drawing Sheets

(51) Int. Cl.
*G06F 3/01* (2006.01)
*G06F 3/0482* (2013.01)
*G06F 3/0481* (2013.01)

(52) U.S. Cl.
CPC ........ *G06F 3/0482* (2013.01); *G06F 3/04817* (2013.01); *G06F 2203/04105* (2013.01); *G06F 2203/04808* (2013.01)

(56) References Cited

U.S. PATENT DOCUMENTS

| | | | | |
|---|---|---|---|---|
| 9,442,648 | B2* | 9/2016 | Kwok | G06F 3/0488 |
| 9,778,764 | B2* | 10/2017 | Suzuki | B60K 37/06 |
| 10,025,402 | B2* | 7/2018 | Shikata | G06F 3/0383 |
| 10,073,493 | B2* | 9/2018 | Takeuchi | G06F 1/1632 |
| 10,203,869 | B2* | 2/2019 | Yamano | G06F 3/04883 |
| 10,212,484 | B2* | 2/2019 | Ferren | G06F 3/048 |
| 10,346,118 | B2* | 7/2019 | Kumon | G01C 21/3664 |
| 2002/0196268 | A1* | 12/2002 | Wolff | H04N 21/2542 |
| | | | | 715/718 |
| 2007/0124694 | A1* | 5/2007 | Sluis | G06F 3/04883 |
| | | | | 715/775 |
| 2007/0135104 | A1* | 6/2007 | Suzuki | G06F 3/03547 |
| | | | | 455/414.1 |
| 2007/0162872 | A1* | 7/2007 | Hong | H04M 1/72469 |
| | | | | 715/828 |
| 2008/0165145 | A1* | 7/2008 | Herz | G06F 3/04883 |
| | | | | 345/173 |
| 2010/0295805 | A1* | 11/2010 | Shin | G06F 3/0488 |
| | | | | 345/173 |
| 2011/0267291 | A1* | 11/2011 | Choi | G06F 3/0488 |
| | | | | 345/173 |
| 2012/0056730 | A1* | 3/2012 | Ujiie | G06F 3/038 |
| | | | | 340/12.22 |
| 2012/0092278 | A1* | 4/2012 | Yamano | G06F 3/04883 |
| | | | | 345/173 |
| 2013/0106693 | A1* | 5/2013 | Okuyama | G06F 3/0482 |
| | | | | 345/157 |
| 2013/0326399 | A1* | 12/2013 | Ferren | G06F 3/048 |
| | | | | 715/784 |
| 2014/0149908 | A1* | 5/2014 | Jeon | G06F 3/0482 |
| | | | | 715/769 |
| 2014/0320516 | A1* | 10/2014 | Son | G06F 3/04817 |
| | | | | 345/589 |
| 2015/0177848 | A1* | 6/2015 | Jung | G09G 5/00 |
| | | | | 715/810 |
| 2015/0268743 | A1* | 9/2015 | Takeuchi | G06F 1/1632 |
| | | | | 345/157 |
| 2015/0317063 | A1* | 11/2015 | Felt | G06F 3/0488 |
| | | | | 715/835 |
| 2015/0324087 | A1* | 11/2015 | Gregory | G06F 3/04845 |
| | | | | 345/174 |
| 2015/0350587 | A1* | 12/2015 | Kim | H04N 21/42208 |
| | | | | 348/734 |
| 2015/0370329 | A1* | 12/2015 | Koyama | B60K 35/00 |
| | | | | 345/173 |
| 2016/0041702 | A1* | 2/2016 | Wang | G06F 3/0482 |
| | | | | 715/830 |
| 2016/0125438 | A1* | 5/2016 | Kamoun | G06Q 30/02 |
| | | | | 705/7.32 |
| 2016/0266652 | A1* | 9/2016 | Son | G06F 3/01 |
| 2016/0370956 | A1* | 12/2016 | Penha | G11B 27/36 |
| 2016/0378319 | A1* | 12/2016 | Cho | G06F 3/016 |
| | | | | 715/773 |
| 2017/0017312 | A1* | 1/2017 | Shikata | G06F 3/0481 |
| 2017/0115943 | A1* | 4/2017 | Hyun | G06F 3/04817 |
| 2017/0277498 | A1* | 9/2017 | Wood, Jr. | G06F 3/033 |
| 2018/0032242 | A1* | 2/2018 | Lee | G06F 3/0488 |
| 2018/0150211 | A1* | 5/2018 | Huang | G06F 3/04847 |
| 2018/0164963 | A1* | 6/2018 | Ku | G06F 3/04886 |
| 2018/0260096 | A1* | 9/2018 | Kamiya | G06F 3/04883 |
| 2018/0260102 | A1* | 9/2018 | Kim | G06F 3/0482 |
| 2019/0114066 | A1* | 4/2019 | Youn | G06F 3/0482 |
| 2019/0391736 | A1* | 12/2019 | Tanaka | G06F 3/016 |

OTHER PUBLICATIONS

Official Communication issued in International Patent Application No. PCT/JP2018/037204, dated Dec. 4, 2018, along with English translation.

* cited by examiner

INPUT DEVICE AND INPUT METHOD

CROSS REFERENCE TO RELATED APPLICATIONS

This is a continuation application of PCT International Application No. PCT/JP2018/037204 filed on Oct. 4, 2018, designating the United States of America, which is based on and claims priority of Japanese Patent Application No. 2017-235934 filed on Dec. 8, 2017.

BACKGROUND

1. Technical Field

The present disclosure relates to an input device through which an input for operating a user interface (UI) displayed by a display disposed in a vehicle is provided, and to an input method used in the input device.

2. Description of the Related Art

Japanese Unexamined Patent Application Publication No. 2004-246920 (Patent Literature (PTL) 1) discloses an information processing device on which a cursor is moved upward, downward, leftward, or rightward according to an input amount of a predetermined input, and a menu item in a menu is selected according to the position of the cursor that has been moved.

SUMMARY

However, the information processing device according to PTL 1 can be improved upon.

In view of this, the present disclosure provides an input device capable of improving upon the above related art.

An input device according to one aspect of the present disclosure provides an input for operating a user interface (UI) including a first menu and displayed by a display disposed in a vehicle, and includes: a sensor which receives a gesture made as a touch by a user; and a controller which causes the display to display, as the first menu, a plurality of first icons aligned in a first direction. The controller causes the display to display a first gauge bar extending from a first reference position, which is used as an origin, on the first menu in the first direction and having a length corresponding to a length of a first gesture input to the sensor along the first direction. The controller selects, from among the plurality of first icons respectively disposed in a plurality of first regions seamlessly aligned, a first icon disposed in a first region where an end portion, which is opposite to the origin in the first direction, of the first gauge bar displayed on the display is located when an input indicating confirmation is provided to the sensor.

Note that these general and specific aspects may be implemented using a system, a method, an integrated circuit, a computer program, and a computer-readable recording medium such as a compact disc read-only memory (CD-ROM) or any combination of systems, methods, integrated circuits, computer programs, and recording media.

The input device according to the present disclosure is capable of improving upon the above related art.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

Figure 1:
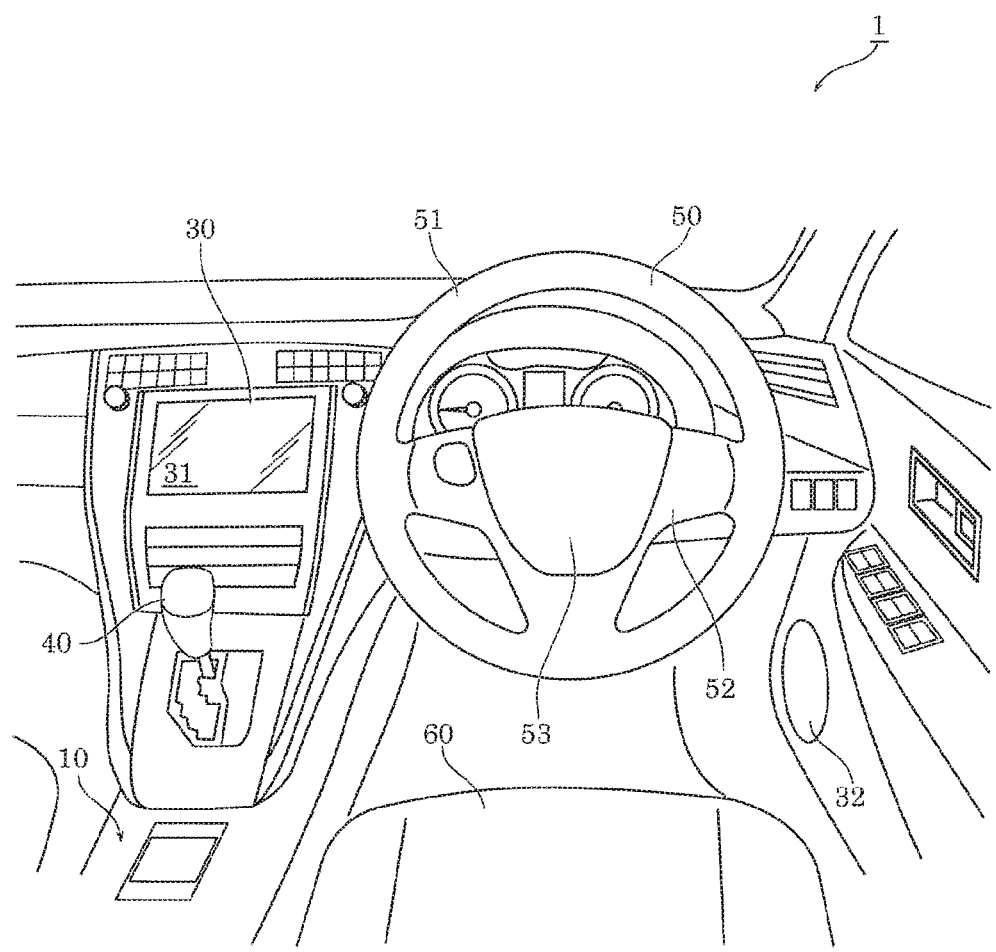
FIG. 1 is a diagram illustrating one example of an input device according to an embodiment and the configuration of the interior of a vehicle in which the input device is disposed.

DETAILED DESCRIPTION OF THE EMBODIMENT (Underlying Knowledge Forming Basis of the Present Disclosure)

In relation to the information processing device mentioned in the BACKGROUND section, the inventor has observed the occurrence of the following problem.

A user who is driving a vehicle drives the vehicle while gazing ahead. Therefore, it is difficult for the user who is driving to move a cursor to the position of a desired menu item, and it is problematic in that an undesired menu item is erroneously selected in the displayed menu or in that it takes time to select a desired menu item in the displayed menu.

In other words, the information processing device disclosed in PTL 1 has the problem of being difficult to provide an accurate input to the menu displayed on the display when a user engages in another task.

In order to solve this problem, an input device according to one aspect of the present disclosure provides an input for operating a user interface (UI) including a first menu and displayed by a display disposed in a vehicle, and includes: a sensor which receives a gesture made as a touch by a user;

and a controller which causes the display to display, as the first menu, a plurality of first icons aligned in a first direction. The controller causes the display to display a first gauge bar extending from a first reference position, which is used as an origin, on the first menu in the first direction and having a length corresponding to a length of a first gesture input to the sensor along the first direction. The controller selects, from among the plurality of first icons respectively disposed in a plurality of first regions seamlessly aligned, a first icon disposed in a first region where an end portion, which is opposite to the origin in the first direction, of the first gauge bar displayed on the display is located when an input indicating confirmation is provided to the sensor.

With this, there is a match between the alignment direction of the plurality of first icons and the direction of the first gesture for adjusting the length of the first gauge bar, and thus a user can intuitively select a desired first icon from among the plurality of first icons. Furthermore, a user can adjust the length of the first gauge bar by merely adjusting the length of the first gesture, and therefore can easily adjust the position of an end portion of the first gauge bar opposite to the origin.

Furthermore, the plurality of first icons are respectively disposed in the plurality of first regions seamlessly aligned. Thus, if an end portion of the first gauge bar is located in the first region for the first icon different from the desired first icon, it is sufficient that a user make the first gesture to move the end portion of the first gauge bar toward the first region in which the desired first icon is disposed; therefore, it is possible to swiftly move the end portion of the first gauge bar to the first region in which the desired first icon is disposed. Accordingly, a user can easily provide an accurate input to the menu displayed on the display even when the user engages in another task such as driving.

Furthermore, the first reference position may be at one end of the first menu in the first direction, and when an orientation of the first gesture corresponds to a first orientation from the one end to another end of the first menu, the controller may cause the display to display the first gauge bar that extends from the first reference position in the first orientation.

With this, the first reference position serving as the origin for displaying the first gauge bar is set to the position of one end of the first menu in the first direction, and thus a user can select a desired first icon from among the plurality of first icons by making the first gesture directed toward a point on the other end side in the first direction. In this manner, a user can select a desired first icon by providing an input limited to one orientation in the first direction, that is, a simple input.

Furthermore, when a position on the sensor in which the origin of the first gesture has been received is closer to one end than to another end of a detection region for the touch on the sensor in the first direction, the controller may set the first reference position to a position of one end of the first menu in the first direction and cause the display to display the first gauge bar that extends in a first orientation from the one end to the other end.

With this, according to the position in the detection region of the sensor in which the origin of the first gesture is received, the direction of the first gauge bar from the first reference position is set to the direction to one of the both ends of the detection region in the first direction that is farther away from said position. Thus, the controller can set the length of the first gesture for adjusting the length of the first gauge bar to at least a half of the length of the detection region in the first direction, allowing a user to easily adjust the length of the first gauge bar.

Furthermore, an actuator which provides a predetermined tactile sensation to the sensor may further be included, and when an end portion, which is opposite to the origin in the first direction, of the first gauge bar has moved from one first region in which one first icon among the plurality of first icons is disposed to another first region in which another first icon adjacent to the one first icon is disposed, the controller may activate the actuator.

Accordingly, it is possible to provide feedback to a user about the fact that the first icon in the first region where the end portion of the first gauge bar is located has transitioned into the first icon disposed in the next first region. Thus, in consideration of the alignment sequence of the plurality of first icons and the number of times feedback has been provided, the user can easily select the desired first icon without gazing at the first menu.

Furthermore, after a lapse of a first length of time without the sensor having received the touch while the first gauge bar is displayed on the display, the controller may cause the display to display the first gauge bar that has a length changed to at most a first width measured from the first reference position in the first direction.

Accordingly, when a user stops touching, the controller can set the length of the first gauge bar to, for example, a default length which is less than or equal to the first width. In other words, when a user makes the next first gesture after a while, the first gauge bar is in the default state, meaning that the length of the first gesture can be the same until the desired first icon is selected. Thus, a user can easily provide an accurate input to the menu.

Furthermore, the controller may cause the display to display a second menu corresponding to a plurality of sub-functions included in a function indicated by a first icon disposed in a first region where an end portion, which is opposite to the origin in the first direction, of the first gauge bar is located, and the second menu may include a plurality of second icons which respectively correspond to the plurality of sub-functions and are aligned in a second direction substantially orthogonal to the first direction.

Thus, a user can easily cause the second menu corresponding to the desired first icon to be displayed.

Furthermore, when the sensor receives a second gesture made along the second direction while the second menu is displayed on the display, the controller may cause the display to display a second gauge bar extending from a second reference position, which is used as an origin, on the second menu in the second direction and having a length corresponding to a length of the second gesture, and the controller may select, from among the plurality of second icons respectively disposed in a plurality of second regions seamlessly aligned, a second icon disposed in a second region where an end portion, which is opposite to the origin in the second direction, of the second gauge bar displayed on the display is located when an input indicating confirmation is provided to the sensor.

Accordingly, the second gauge bar can be displayed as a result of the second gesture made along the second direction substantially orthogonal to the first direction and thus, even when the second menu is displayed, the input to the first menu and the input to the second menu can be discerned.

Furthermore, as in the case of the input to the first menu, since there is a match between the alignment direction of the plurality of second icons and the direction of the second gesture for adjusting the length of the second gauge bar, a user can intuitively select a desired second icon from among the plurality of second icons. Moreover, a user can adjust the length of the second gauge bar by merely adjusting the length of the second gesture, and therefore can easily adjust the position of an end portion of the second gauge bar opposite to the origin.

Furthermore, the plurality of second icons are respectively disposed in the plurality of second regions seamlessly aligned. Thus, if an end portion of the second gauge bar is located in the second region for the second icon different from the desired second icon, it is sufficient that a user make the second gesture to move the end portion of the second gauge bar toward the second region in which the desired second icon is disposed; therefore, it is possible to swiftly move the end portion of the second gauge bar to the second region in which the desired second icon is disposed. Accordingly, a user can easily provide an accurate input to the menu displayed on the display even when the user engages in another task such as driving.

Furthermore, when the sensor has not received the touch for the second length of time while the second menu is displayed on the display, the controller may cause the display to delete display of the second menu.

Thus, when a user stops touching, the controller can cause the display of the second menu to be deleted, for example, leaving only the first menu as displayed. In other words, since a user makes the first gesture as the input to the first menu in the default state after a while, the length of the first gesture can be the same until the desired first icon is selected. Thus, a user can easily provide an accurate input to the menu.

Furthermore, the controller may recognize, as the first gesture, a gesture directed into a first angle range which is centered on the origin of the input to the sensor and includes the first direction, and recognize, as the second gesture, a gesture directed into a second angle range which is centered on the origin, is adjacent to the first angle range, and includes the second direction.

This allows the controller to discern whether the gesture input by a user is the first gesture or the second gesture even when the gesture is not made precisely along the first direction or the second direction. Thus, a user can easily input a gesture.

Furthermore, a storage which stores priorities having different values respectively associated with the plurality of first icons may further be included, and when causing the display to display the first gauge bar, the controller may set, to the first reference position, a position located in a region where a first icon having a highest priority among the priorities stored in the storage is disposed.

This allows a user to easily select the first icon having the highest priority.

Furthermore, when causing the display to display the first menu, the controller may align the plurality of first icons in the first direction in descending order of the priorities of the plurality of first icons from the highest priority.

This allows a user to reduce the length of the first gesture to be input to select the first icon that is frequently selected, for example. Accordingly, a user can reduce the time required to select the first icon and thus can easily select the first icon.

Furthermore, the storage may store, as the priorities, priorities of the plurality of first icons that have been preset by a user.

This allows a user to reduce the length of the first gesture to be input to select the first icon that is frequently selected. Accordingly, a user can reduce the time required to select the first icon and thus can easily select the first icon.

Furthermore, the controller may associate each of the plurality of first icons with a priority that increases with increasing frequency of selection by the user during a predetermined period extending back from a current point in time, and may update the priorities stored in the storage using the priority associated.

This allows a user to reduce the length of the first gesture to be input to select the first icon that is frequently selected. Accordingly, a user can easily select the first icon.

Furthermore, when the first gauge bar is displayed on the display, the controller may cause a first icon, which is disposed in a region where an end portion, which is opposite to the origin in the first direction, of the first gauge bar displayed on the display is located, to be displayed highlighted.

This allows a user to easily find the first icon focused on in the first gauge bar. Thus, it is possible to shorten the time a user gazes at the UI.

Furthermore, a storage which stores priorities having different values respectively associated with the plurality of second icons may further be included, and when causing the display to display the second gauge bar, the controller may set, to the second reference position, a position located in a region where a second icon having a highest priority among the priorities stored in the storage is disposed.

This allows a user to easily select the second icon having the highest priority.

Furthermore, when causing the display to display the second menu, the controller may align the plurality of second icons in the second direction in descending order of the priorities of the plurality of second icons from the highest priority.

This allows a user to reduce the length of the second gesture to be input to select the second icon that is frequently selected, for example. Accordingly, a user can reduce the time required to select the second icon and thus can easily select the second icon.

Furthermore, the storage may store, as the priorities, priorities of the plurality of second icons that have been preset by a user.

This allows a user to reduce the length of the second gesture to be input to select the second icon that is frequently selected. Accordingly, a user can reduce the time required to select the second icon and thus can easily select the second icon.

Furthermore, the controller may associate each of the plurality of second icons with a priority that increases with increasing frequency of selection by the user during a predetermined period extending back from a current point in time, and may update the priorities stored in the storage using the priority associated.

This allows a user to reduce the length of the second gesture to be input to select the second icon that is frequently selected. Accordingly, a user can easily select the second icon.

Furthermore, when the second gauge bar is displayed on the display, the controller may cause a second icon, which is disposed in a region where an end portion, which is opposite to the origin in the second direction, of the second gauge bar displayed on the display is located, to be displayed highlighted.

This allows a user to easily find the second icon focused on in the second gauge bar. Thus, it is possible to shorten the time a user gazes at the UI.

Furthermore, the sensor may be disposed on the center console in the vehicle or the steering wheel of the vehicle.

Furthermore, the display may further be included.

Note that these general and specific aspects may be implemented using a system, a method, an integrated circuit, a computer program, and a computer-readable recording medium such as a compact disc read-only memory (CD-ROM) or any combination of systems, methods, integrated circuits, computer programs, and recording media.

Hereinafter, the input device and the input method according to one aspect of the present disclosure will be specifically described with reference to the drawings.

Note that the embodiment described below presents a specific example of the present disclosure. The numerical values, shapes, materials, structural elements, the arrangement and connection of the structural elements, steps, the processing order of the steps, etc. presented in the following embodiment are mere examples, and therefore do not limit the present disclosure. As such, among the structural elements in the following embodiment, structural elements not recited in any one of the independent claims which indicate the broadest concepts are described as arbitrary structural elements.

EMBODIMENT

[1. Configuration of Input Device]

First, an input device according to an embodiment and the configuration of the interior of a vehicle in which the input device is disposed will be described with reference to FIG. 1. FIG. 1 is a diagram illustrating one example of the input device according to the embodiment and the configuration of the interior of the vehicle in which the input device is disposed. Note that in the following description, the directions indicated by the terms "front/ahead/forward", "back/behind/rearward", "right/rightward", and "left/leftward" are defined using the direction of travel of the vehicle as a reference. The directions indicated by the terms "up/above/upward", "down/below/downward", "horizontal/horizontally", and "vertical/vertically" are defined in the state where the wheels of the vehicle are on the ground. Therefore, the term "upward/downward" is equivalent to the term "vertical/vertically".

First inputter 10 included in the input device and in-vehicle device 30 are mounted in the interior of automobile 1 (one example of the vehicle) illustrated in FIG. 1. Furthermore, shift lever 40 and steering 50 are disposed in the interior of automobile 1. The input device provides an input for operating a user interface (UI) which is displayed by display 31 of in-vehicle device 30 mounted in a vehicle such as automobile 1.

First inputter 10 is an input interface for operating the UI displayed on display 31 of in-vehicle device 30. By operating the UI, a user can control in-vehicle device 30 mounted in automobile 1.

First inputter 10 is disposed rearward of shift lever 40. In other words, first inputter 10 is disposed in a position that is not on steering 50, but is within reach of a hand of a user on automobile 1 who is seated on seat 60. A driver, who is a user, can provide an input to first inputter 10 disposed rearward of shift lever 40 with his or her left hand to operate in-vehicle device 30. Note that first inputter 10 does not need to be disposed in the abovementioned position as long as first inputter 10 is disposed in a position that is not on steering 50, but is within reach of a hand of said user. Furthermore, although FIG. 1 exemplifies a right-hand drive automobile, substantially the same can be true for a left-hand drive automobile because it is only necessary to reverse the left-right relationship.

Steering 50 is for steering automobile 1 and includes: rim 51 in the shape of a ring; spoke 52 in an approximate T-shape integrally formed on the inner peripheral surface of rim 51; and horn switch cover 53 which covers a horn switch (not illustrated in the drawings) disposed in the central portion of spoke 52. The configuration of first inputter 10 will be described in detail later.

In-vehicle device 30 is, for example, a car navigation system, audio equipment for playing an optical disc, or a video player. In-vehicle device 30 includes display 31. Display 31 displays a map for car navigation, played back video, a UI for operating in-vehicle device 30, a UI for controlling other in-vehicle devices, and the like. Display 31 is exemplified by a liquid-crystal display or an organic electroluminescent (EL) display. In-vehicle device 30 may be connected to loudspeaker 32 and output audio to loudspeaker 32. Examples of other in-vehicle devices includes an air conditioner, and the operation of the air conditioner may be controlled according to an input to the input device.

Next, the hardware configuration of first inputter 10 will be described with reference to FIG. 2.

Figure 2:
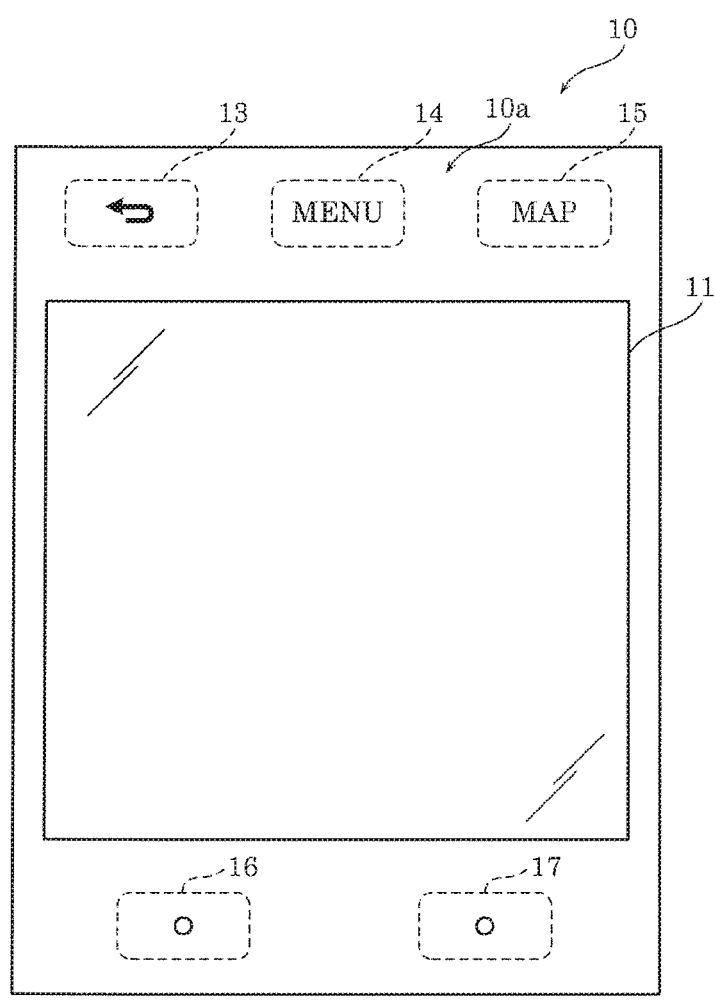
FIG. 2 is an external perspective view of a first inputter when viewed from the front in a direction of travel of a vehicle.

FIG. 2 is a plan view of the first inputter when viewed from above the vehicle.

First inputter 10 includes first touch sensor 11. First inputter 10 may further include pressure-sensitive sensor 12. First inputter 10 may further include touch switches 13 to 17. First inputter 10 has flat surface 10a. First touch sensor 11 and touch switches 13 to 17 detect a user touch to surface 10a of first inputter 10. First touch sensor 11 and touch switches 13 to 17 are disposed in positions that do not overlap with one another.

First touch sensor 11 receives a user touch and is, for example, a touch pad. Specifically, first touch sensor 11 detects a position in the detection region of first touch sensor 11 which a user touches with his or her body part (for example, finger). Furthermore, first touch sensor 11 receives more than one user touch, i.e., multiple user touches. Thus, first touch sensor 11 is capable of receiving not only the touch position of one finger, but also two touch positions of two fingers and three touch positions of three fingers at the same time.

Pressure-sensitive sensor 12 is disposed in a region overlapping with first touch sensor 11 and detects press inputs to first touch sensor 11 and touch switches 13 to 17. An input having, for example, a pressing force greater than a predetermined pressing force to pressure-sensitive sensor 12 may be received as an input indicating, for example, confirmation. Note that the position of pressure-sensitive sensor 12 is not limited to the position in the region overlapping with first touch sensor 11; for example, a plurality of (in the example in FIG. 2, six) pressure sensitive sensors 12 may be disposed in respective regions overlapping with first touch sensor 11 and touch switches 13 to 17.

Touch switches 13 to 15 are disposed forward of first touch sensor 11 and are aligned horizontally. Touch switches 16 and 17 are disposed rearward of first touch sensor 11 and are aligned horizontally. Touch switches 13 to 17 detect whether or not the respective regions in which touch switches 13 to 17 are disposed have been touched.

Touch switch 13 is, for example, a back switch. When a touch of touch switch 13 is detected, the UI displayed on display 31 is changed to the previously displayed UI.

Touch switch 14 is, for example, a menu switch. When a touch of touch switch 14 is detected, a menu is displayed on the UI displayed on display 31.

Touch switch 15 is, for example, a map switch, When a touch of touch switch 15 is detected, a map is displayed on the UI displayed on display 31.

Touch switches 16, 17 are, for example, customized switches. A user can assign shortcut inputs to touch switches 16, 17 in advance, and when a touch of each of touch switches 16, 17 is detected, an application based on the shortcut assigned by the user starts or a predetermined operation indicated by the shortcut is performed, for example.

As just described, first inputter 10 is composed of sensors including first touch sensor 11, pressure-sensitive sensor 12, and touch switches 13 to 17.

Note that in the present embodiment, first inputter 10 is disposed in an attitude such that surface 10a is substantially perpendicular to the upward/downward direction. First inputter 10 may be disposed in an attitude such that surface 10a is substantially perpendicular to the forward/rearward direction. First inputter 10 in the case of being disposed in an attitude such that surface 10a is substantially perpendicular to the forward/rearward direction may be disposed so that, for example, the surface of a sensor which a user touches faces rearward.

By providing an input to the touch sensor, various switches, etc., included in first inputter 10, a user can operate the UI displayed on display 31 of in-vehicle device 30.

[2. Functional Configuration of Input Device]

Next, the functional configuration of the input device will be described.

Figure 3:
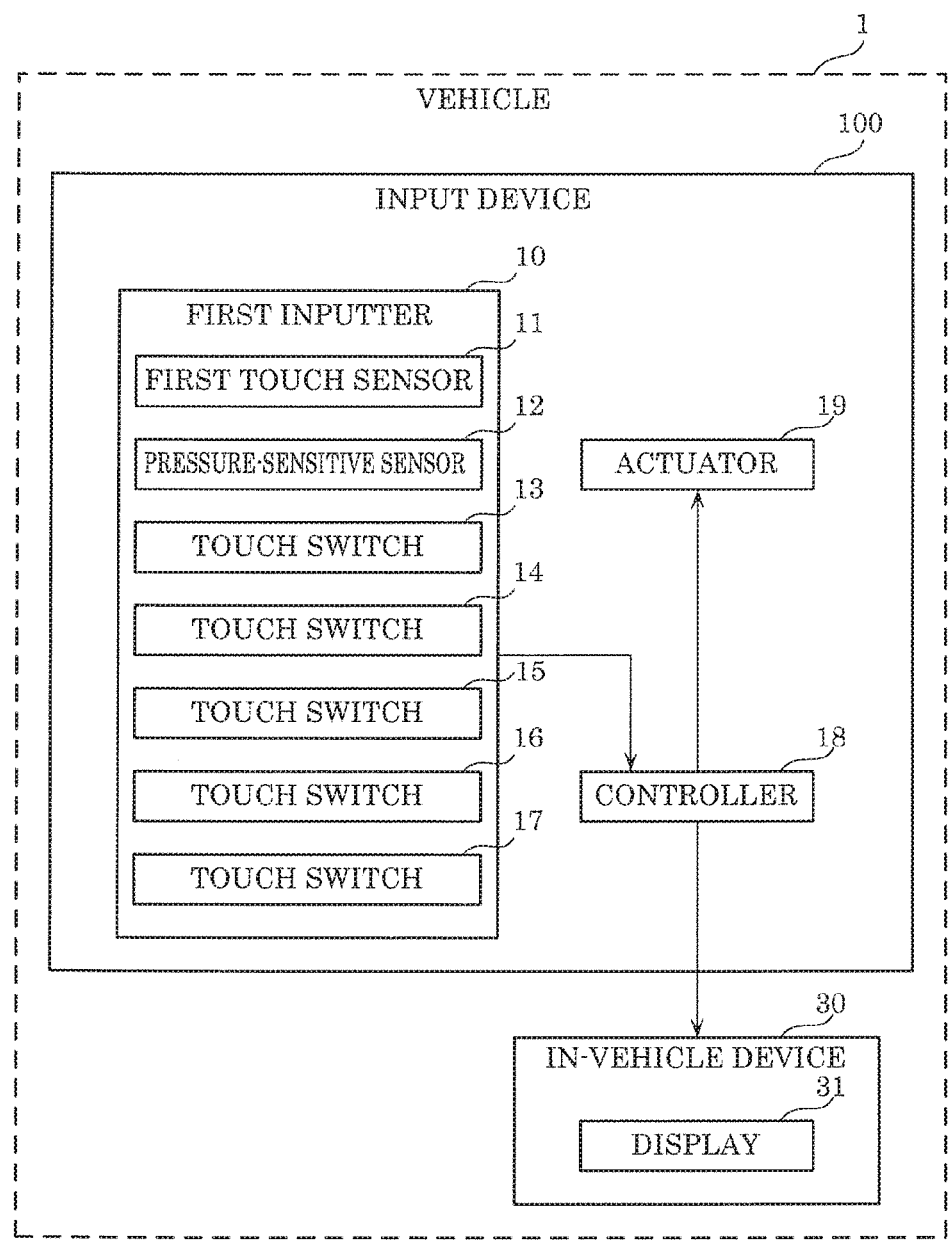
FIG. 3 is a block diagram illustrating one example of a functional configuration of an input device mounted on an automobile according to an embodiment.

FIG. 3 is a block diagram illustrating one example of the functional configuration of the input device mounted on the automobile according to the embodiment.

As illustrated in FIG. 3, input device 100 includes first inputter 10, controller 18, and actuator 19.

First inputter 10 includes first touch sensor 11, pressure-sensitive sensor 12, and touch switches 13 to 17. When an input is provided to each of first touch sensor 11, pressure-sensitive sensor 12, and touch switches 13 to 17, an input signal indicating said input is output to controller 18.

Controller 18 transmits a control signal for controlling in-vehicle device 30 according to the input signal output by first inputter 10. Specifically, controller 18 causes display 31 of in-vehicle device 30 to display a display screen including a gesture guide and an operation screen. Furthermore, when first inputter 10 outputs an input signal indicating that a menu is to be displayed, controller 18 causes display 31 to display the menu on the operation screen of display 31. Details of the control of controller 18 in response to the input signal will be described later.

Note that controller 18 may be implemented, for example, using a processor which executes a predetermined program and a memory in which the predetermined program is stored, or may be implemented using a dedicated circuit. Controller 18 may be implemented using an electronic control unit (ECU), for example.

Actuator 19 provides feedback of a tactile sensation to a user by applying a predetermined vibration to first inputter 10, which serves as a sensor, according to the control signal output by controller 18. Actuator 19 is implemented, for example, using a piezoelectric element or the like. Note that the configuration of actuator 19 is not limited, to the configuration in which feedback of a tactile sensation is provided by means of vibrations; for example, actuator 19 may present a friction sensation using static electricity or may generate an electrical stimulus.

Hereinafter, the display screen which is displayed by controller 18 will be specifically described.

Figure 4:
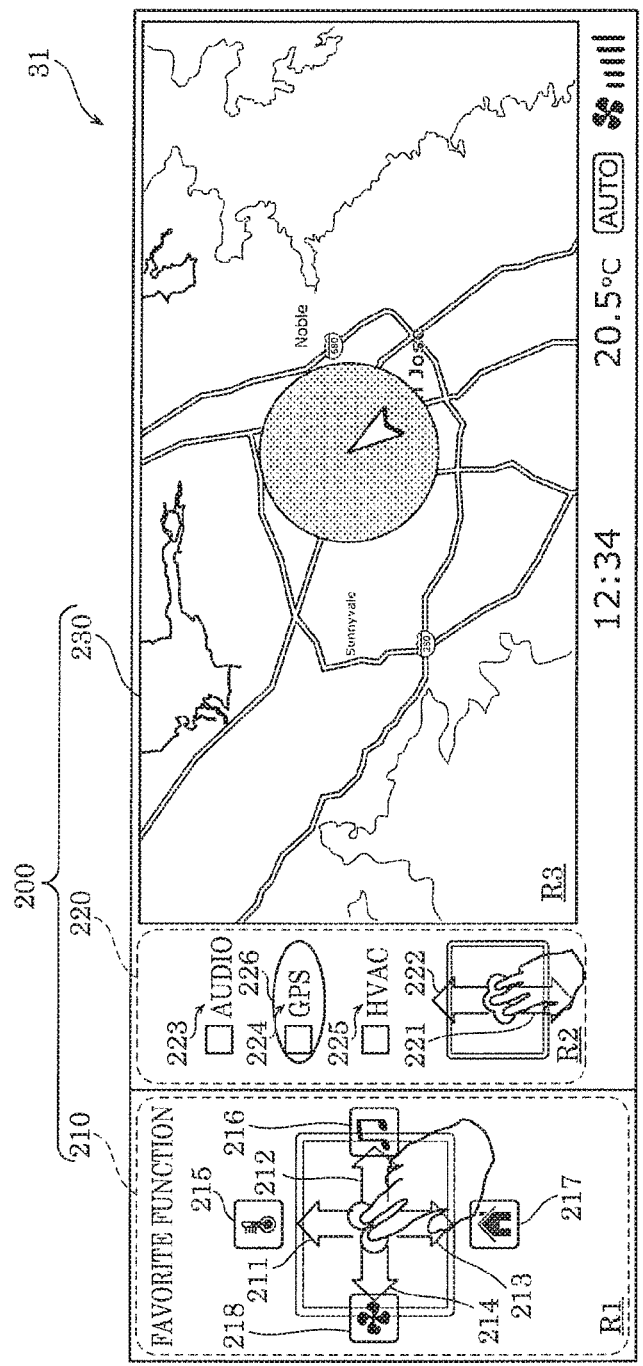
FIG. 4 is a diagram illustrating one example of a display screen displayed on a display.

Controller 18 may cause display 31 of in-vehicle device 30 to display the display screen, as illustrated in FIG. 4, for example. FIG. 4 is a diagram illustrating one example of the display screen displayed on the display.

As illustrated in FIG. 4, controller 18 causes display 31 of in-vehicle device 30 to display display screen 200 including gesture guides 210, 220 and operation screen 230. Note that according to a user input to first inputter 10, controller 18 causes display 31 to display an operation guide screen, an operation screen different from operation screen 230, or the like in third region R3 in which operation screen 230 is displayed in FIG. 4.

First gesture guide 210 is displayed in first region R1 located on the left side among the plurality of (herein three) regions R1 to R3 included in the display region of display 31. First gesture guide 210 includes: more than one kind of gestures 211 to 214 made with the first count of fingers; and icons 215 to 218 each of which is associated with a corresponding one of more than one kind of gestures 211 to 214 and indicates the kind of an operation guide screen to be displayed as the second display screen when the gesture of the corresponding kind is input. More than one kind of gestures 211 to 214 indicate inputs that are made by running the first count of fingers in a predetermined direction on first touch sensor 11. The first count is, for example, two.

Specifically, gesture 211 indicates the input made by running two fingers forward on first touch sensor 11. Gesture 212 indicates the input made by running two fingers rightward on first touch sensor 11. Gesture 213 indicates the input made by running two fingers rearward or first touch sensor 11. Gesture 214 indicates the input made by running two fingers leftward on first touch sensor 11.

Note that in the case where first inputter 10 is disposed in an attitude such that surface 10a of first inputter 10 is substantially perpendicular to the forward/rearward direction to face rearward, gesture 211 indicates the input made by running two fingers upward on first touch sensor 11, and gesture 213 indicates the input made by running two fingers downward on the first touch sensor 11.

Icon 215 is associated with gesture 211. When first touch sensor 11 receives the gesture indicated by gesture 211, controller 18 causes display 31 to display an operation guide screen for adjusting the heating and cooling temperature settings of the air conditioner for heating, cooling, and ventilating automobile 1.

Icon 216 is associated with gesture 212 and indicates that an operation guide screen for selecting a song in a music player is to be displayed on display 31. When first touch sensor 11 receives the gesture indicated by gesture 212, controller 18 causes display 31 to display the operation guide screen for selecting a song.

Icon 217 is associated with gesture 213 and indicates that an operation guide screen for configuring the car navigation system to return home is to be displayed on display 31. When first touch sensor 11 receives the gesture indicated by gesture 213, controller 18 causes display 31 to display the operation guide screen for configuring the setting for returning home.

Icon 218 is associated with gesture 214 and indicates that an operation guide screen for adjusting the fan speed settings of the air conditioner in automobile 1 is to be displayed on display 31. When first touch sensor 11 receives the gesture indicated by gesture 214, controller 18 causes display 31 to display the operation guide screen for adjusting the fan speed settings.

Second gesture guide 220 is displayed in second region R2 located on the right side adjacent to first region R1 among three regions R1 to R3 included in the display region of display 31. Gesture guide 220 includes: more than one kind of gestures 221, 222 made with the second count of (for example, three) fingers; and icons 223 to 225 each of which is associated with a corresponding one of more than one kind of gestures 221, 222 and indicates the kind of an operation screen to be displayed as the second display screen when the gesture of the corresponding kind is input. Furthermore, second gesture guide 220 may include focus indication 226. Focus indication 226 indicates that the operation screen corresponding to the icon currently focused on by focus indication 226 is the operation screen displayed in third region R3 on the right side among three regions R1 to R3 included in the display region of display 31. More than one kind of gestures 221, 222 indicate inputs that are made by running the second count of fingers on first touch sensor 11 in a predetermined direction or in the direction opposite to the predetermined direction. The second count is different from the first count and is, for example, three.

Specifically, gesture 221 indicates the input made by running three fingers forward on first touch sensor 11. Gesture 222 indicates the input made by running three fingers rearward on first touch sensor 11. Note that in this case, gestures 221, 222 are described herein as the inputs made by running fingers forward and rearward, but may be the inputs made by running fingers leftward and rightward.

Note that in the case where first inputter 10 is disposed in an attitude such that surface 10*a* of first inputter 10 is substantially perpendicular to the forward/rearward direction to face rearward, gesture 221 indicates the input made by running three fingers upward on first touch sensor 11, and gesture 222 indicates the input made by running three fingers downward on the first touch sensor 11.

Each of icons 223 to 225 indicates an operation screen to be displayed in third region R3 when the icon is selected. Specifically, controller 18 causes the operation screen indicated by the icon focused on by focus indication 226 to be displayed in third region R3. Icons 223 to 225 are aligned in a preset sequence for displaying more than one kind of operation screens.

Icon 223 indicates that when the icon is focused on by focus indication 226, an operation screen for receiving a user operation of the music player is to be displayed in third region R3. When focus indication 226 moves to icon 223 through the input of the gesture indicated by gesture 221 or gesture 222, controller 18 causes the operation screen for receiving a user operation of the music player to be displayed in third region R3.

Icon 224 indicates that when the icon is focused on by focus indication 226 (specifically, in the case illustrated in FIG. 4), operation screen 230 for receiving a user operation of the car navigation system is to be displayed in third region R3. When focus indication 226 moves to icon 224 through the input of the gesture indicated by gesture 221 or gesture 222, controller 18 causes operation screen 230 for receiving a user operation of the car navigation system to be displayed in third region R3.

Icon 225 indicates that when the icon is focused on by focus indication 226, an operation screen for receiving a user operation of the air conditioner is to be displayed in third region R3. When focus indication 226 moves to icon 224 through the input of the gesture indicated by gesture 221 or gesture 222, controller 18 causes the operation screen for receiving a user operation of the air conditioner to be displayed in third region R3.

Note that the first count is described as two and the second count is described as three, but these are not limited to the abovementioned combination as long as the first count and the second count are plural and are different from each other. Specifically, the first count and the second count may be the combination of three and two, may be the combination of two and four, or may be the combination of four and two, for example. It goes without saying that in the combination, one of the first count and the second count may be five.

Operation screen 230 is displayed in third region R3. In FIG. 4, operation screen 230 is for receiving a user operation of the car navigation system. Note that as described above, one of the operation screen, the operation guide screen, and the menu that corresponds to the kind of the gesture input to first touch sensor 11 is displayed in third region R3.

Figure 5:
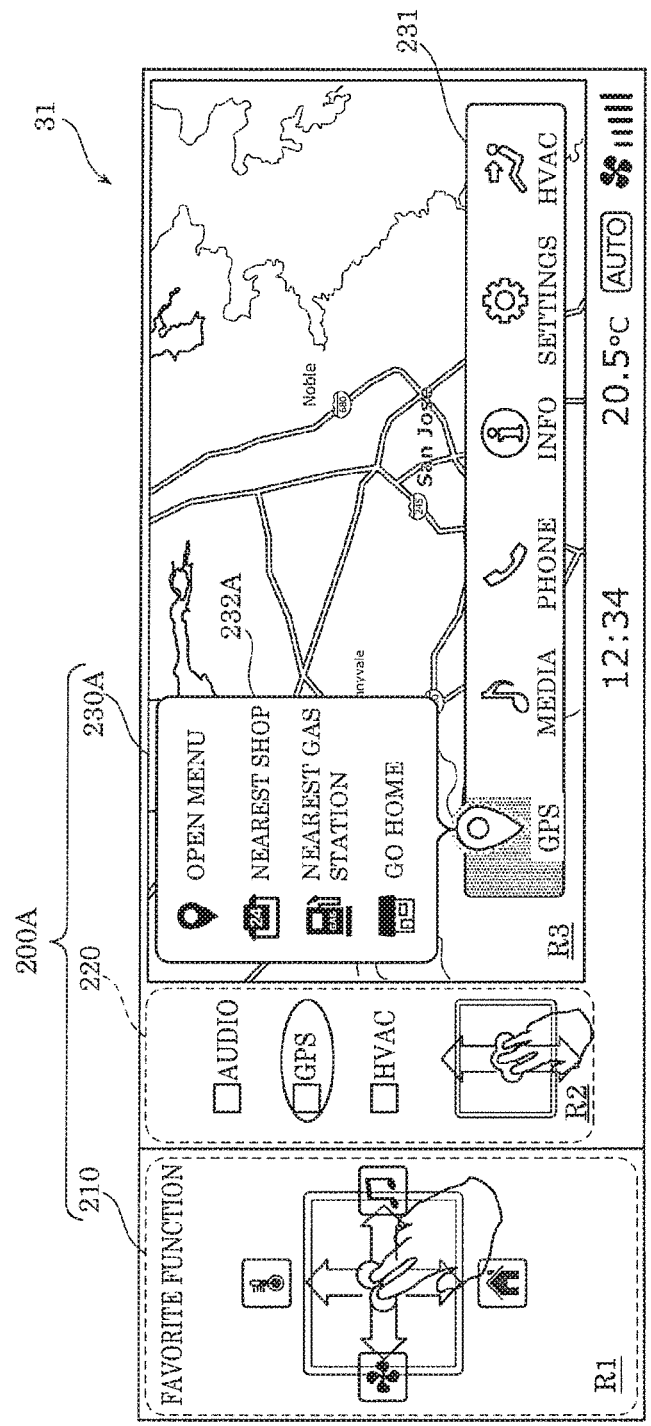
FIG. 5 is a diagram illustrating another example of the display screen displayed on the display.

Furthermore, controller 18 may cause display 31 to display display screen 200A that includes operation screen 230A with first menu 231 and second menu 232A superimposed thereon, as illustrated in FIG. 5, for example. FIG. 5 is a diagram illustrating another example of the display screen displayed on the display.

Next, a method for providing an input to each of first menu 231 and second menus 232A, 232B displayed over operation screen 230A in third region R3 of display 31 will be specifically described with reference to FIG. 6 to FIG. 10.

FIG. 6 to FIG. 10 are diagrams for describing the method for providing an input to each of the first menu and the second menu.

Figure 6:
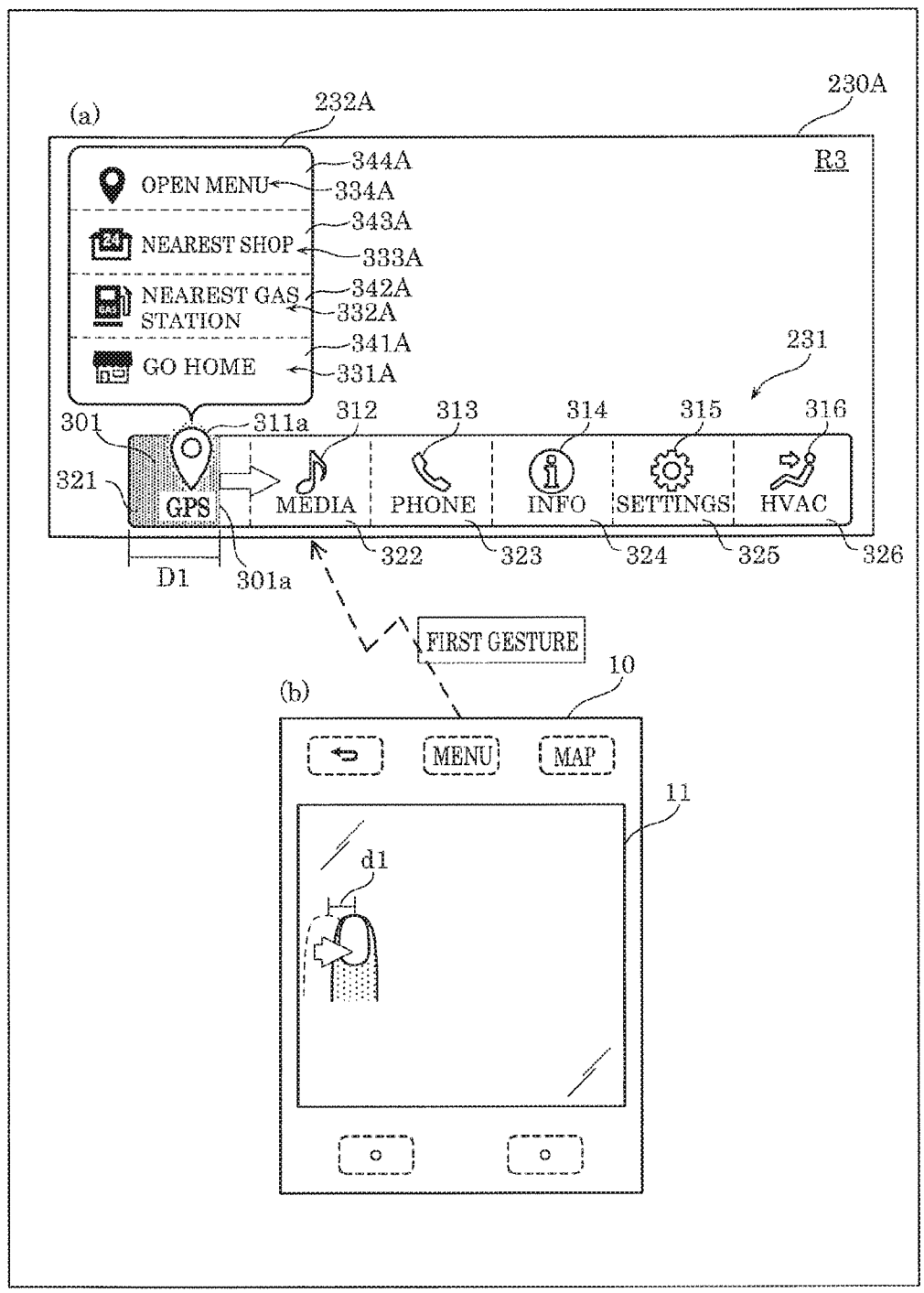
FIG. 6 is a diagram for describing a method for providing an input to each of a first menu and a second menu.

In FIG. 6, (a) is a diagram for describing first menu 231 and second menu 232A which are displayed on operation screen 230A according to the rightward gesture input to first inputter 10. In FIG. 6, (b) is a diagram illustrating the input to first inputter 10. As illustrated in (a) in FIG. 6, first menu 231 includes a plurality of first icons 311*a*, 312 to 316 aligned horizontally in the first direction. The plurality of first icons 311*a*, 312 to 316 are respectively disposed in a plurality of first regions 321 to 326 seamlessly aligned. Note that in the drawings, first menu 231 includes the dashed lines indicating the boundaries between the plurality of first regions 321 to 326, but these dashed lines are drawn for the purpose of illustration and are virtual lines that are not displayed on first menu 231. The plurality of first icons 311*a*, 312 to 316 correspond to car navigation, playing music, call, information, settings, and heating, ventilation, and air conditioning (HVAC), respectively.

When first touch sensor 11 of first inputter 10 receives the first gesture directed to one side (specifically, to the right) in the first direction as illustrated in (b) in FIG. 6 in the state where first menu 231 is displayed, controller 18 causes display 31 to display, on operation screen 230A, first gauge bar 301 extending horizontally from the first reference position, which serves as the origin, on first menu 231. Specifically, controller 18 causes display 31 to display, on operation screen 230A, first gauge bar 301 having length D1 corresponding to length d1 of the first gesture horizontally input to first touch sensor 11.

Here, the first reference position is the position of one end in a horizontal direction, which is the left end in the present embodiment, of first menu 231. When the orientation of the first gesture corresponds to the first orientation (rightward) from one end (left end) to the other end (right end) of first menu 231, controller 18 causes display 31 to display, on operation screen. 230A, first gauge bar 301 extending rightward from the position of the left end of first menu 231 which serves as the first reference position. Note that in (a) in FIG. 6, first gauge bar 301 is shown by dot hatching.

In other words, the first reference position serving as the origin for displaying first gauge bar 301 is set to the position of the left end of first menu 231 in a horizontal direction, and thus a user can select a desired first icon from among the plurality of first icons 311*a*, 312 to 316 by making the first gesture directed rightward. In this manner, a user can select a desired first icon by providing an input limited to one horizontal orientation (in the present embodiment, rightward), that is, a simple input.

Furthermore, controller 18 may cause first icon 311a, which is disposed in first region 321 where end portion 301a at the far end in the first direction (specifically, the right end) of first gauge bar 301 displayed on operation screen 230A of display 31 is located, to be displayed highlighted. When displayed highlighted, first icon 311a may be large, may be thick, or may be bright, compared to other first icons 312 to 316, for example. Furthermore, when displayed highlighted, first icon 311a may be in a color different from the color of each of other first icons 312 to 316, for example. Furthermore, when first icon 311a is displayed highlighted, only first icon 311a may flash, for example. Note that first icon 311a not displayed highlighted is displayed as first icon 311 illustrated in FIG. 7, etc.

Furthermore, controller 18 may cause display 31 to display, on operation screen 230A, second menu 232A corresponding to a plurality of sub-functions included in the function indicated by first icon 311a disposed in the first region where end portion 301a of first gauge bar 301 is located. Second menu 232A is displayed, for example, in a region above first icon 311a. Second menu 232A corresponds to first icon 311a and includes a plurality of second icons 331A to 334A respectively corresponding to a plurality of sub-functions about the car navigation function. The plurality of second icons 331A to 334A are aligned vertically in the second direction substantially orthogonal to the first direction which is horizontal. Thus, a user can easily cause second menu 232A corresponding to desired first icon 311a to be displayed.

The plurality of second icons 331A to 334A are respectively disposed in the plurality of second regions 341A to 344A seamlessly aligned. Note that in the drawings, second menu 232A includes the dashed lines indicating the boundaries between the plurality of second regions 341A to 344A, but these dashed lines are drawn for the purpose of illustration and are virtual lines that are not displayed on second menu 232A.

Furthermore, after the lapse of a first length of time without first touch sensor 11 having received any touch while first gauge bar 301 is displayed on display 31, controller 18 may cause display 31 to display first gauge bar 301 that has a length changed to at most the first horizontal width of the plurality of first regions 321 to 326 measured from the first reference position. In other words, when no touch has been made for the first length of time, controller 18 may cause first gauge bar 301 having a default length to be displayed. Controller 18 may set the default length to zero, may set the default length less than the horizontal width of each of first regions 321 to 326, or may set the default length less than length D1.

Accordingly, when a user stops touching, controller 18 can set the length of first gauge bar 301 to, for example, a default length which is less than or equal to the first width. In other words, when a user makes the next first gesture after a while, the first gauge bar is in the default state, meaning that the length of the first gesture can be the same until the desired first icon is selected. Thus, a user can easily provide an accurate input to the menu.

Next, the case where a user has extended rightward the first gesture in the state illustrated in FIG. 6 will be described with reference to FIG. 7.

Figure 7:
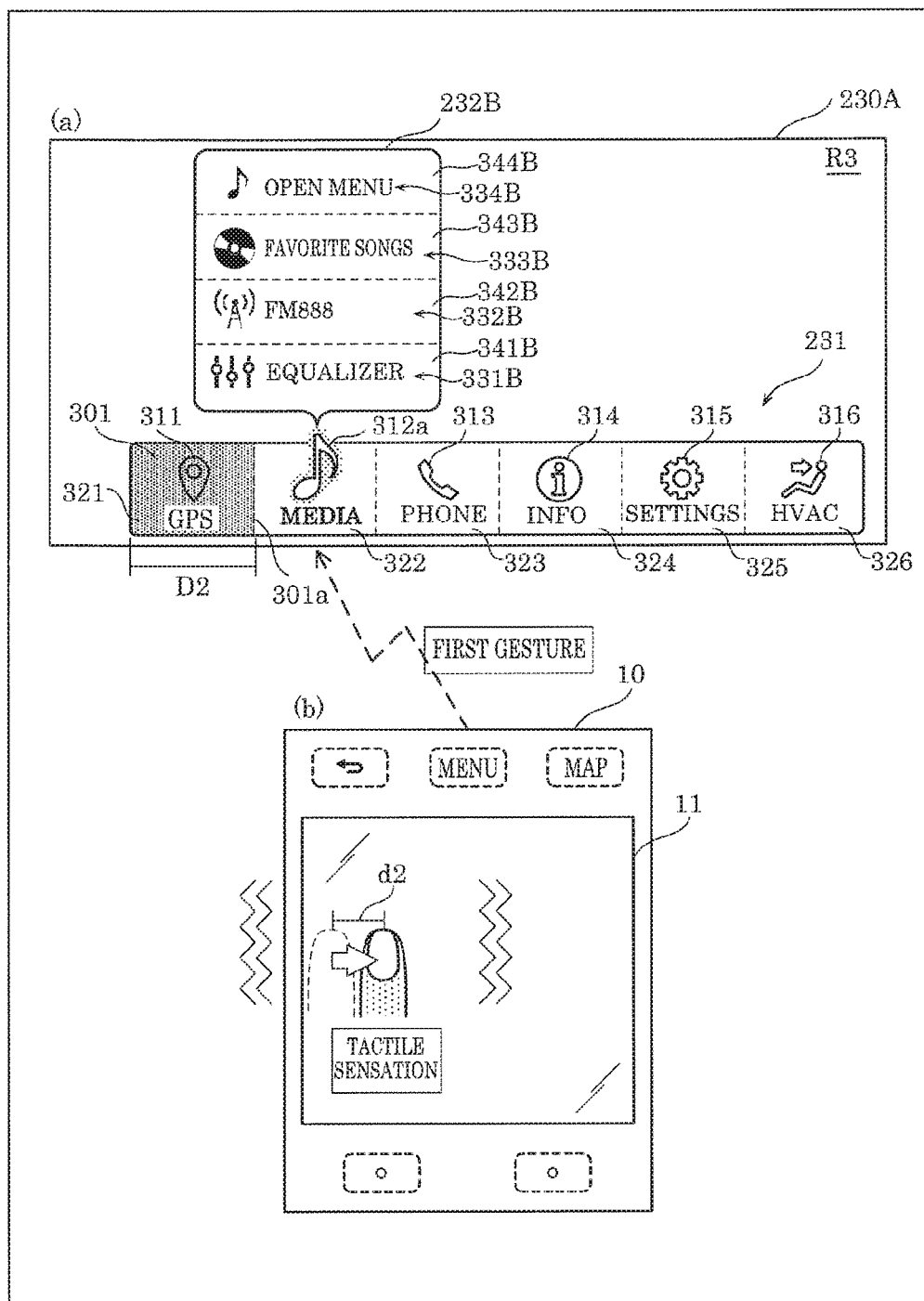
FIG. 7 is a diagram for describing a method for providing an input to each of a first menu and a second menu.

In FIG. 7, (a) is a diagram for describing first menu 231 and second menu 232B which are displayed on operation screen 230A according to the rightward gesture input to first inputter 10. In FIG. 7, (b) is a diagram illustrating the input to first inputter 10.

When the first gesture extended rightward is input to first touch sensor 11 as illustrated in (b) in FIG. 7, controller 18 causes display 31 to display, on operation screen 230A, first gauge bar 301 having length D2 corresponding to length d2 of the first gesture that has been input. Note that length d2 is greater than length d1, and length D2 is greater than length D1.

Subsequently, when end portion 301a of first gauge bar 301 has moved from first region 321 to another first region 322 adjacent to first region 321 among the plurality of first regions 321 to 326 as a result of increasing the length of first gauge bar 301, as illustrated in (a) in FIG. 7, controller 18 focuses on first icon 312a disposed in first region 322 where end portion 301a is located.

Thus, controller 18 displays highlighted first icon 312a and displays second menu 232B corresponding to first icon 312a in a region above first icon 312a. Note that first icon 312a not displayed highlighted is displayed as first icon 312 illustrated in FIG. 6, etc. Second menu 232B corresponds to first icon 312a and includes a plurality of second icons 331B to 334B corresponding to a plurality of sub-functions about the music playing function. The plurality of second icons 331B to 334B are aligned vertically. The plurality of second icons 331B to 334B are respectively disposed in the plurality of second regions 341B to 344B seamlessly aligned. Note that in the drawings, second menu 232B includes the dashed lines indicating the boundaries between the plurality of second regions 341B to 344B, but these dashed lines are drawn for the purpose of illustration and are virtual lines that are not displayed on second menu 232B.

Furthermore, when end portion 301a of first gauge bar 301 has moved from first region 321 to first region 322, that is, when end portion 301a has moved across the boundary line between first region 321 and first region 322, controller 18 activates actuator 19 to vibrate first touch sensor 11. Thus, controller 18 provides feedback of a tactile sensation to the user.

Accordingly, it is possible to provide feedback to a user about the fact that the first icon in the first region where end portion 301 of first gauge bar 301 is located has transitioned into the first icon disposed in the next first region. Thus, in consideration of the alignment sequence of the plurality of first icons and the number of times feedback has been provided, the user can easily select the desired first icon without gazing at the first menu.

Next, the case where a user has extended rightward the first gesture in the state illustrated in FIG. 7 will be described with reference to FIG. 8.

Figure 8:
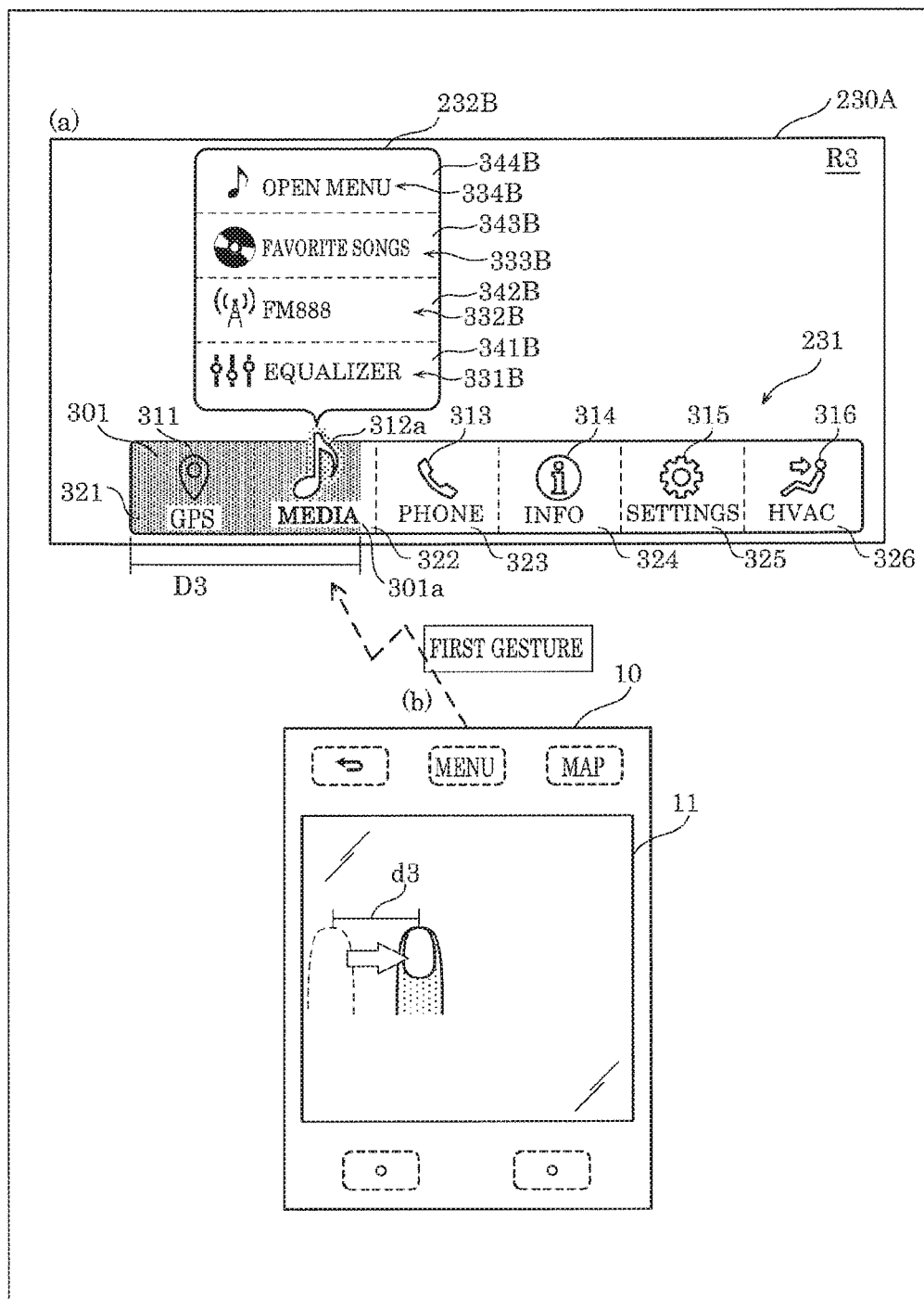
FIG. 8 is a diagram for describing a method for providing an input to each of a first menu and a second menu.

In FIG. 8, (a) is a diagram for describing first menu 231 and second menu 232B which are displayed on operation screen 230A according to the rightward gesture input to first inputter 10. In FIG. (b) is a diagram illustrating the input to first inputter 10.

When the first gesture extended rightward is input to first touch sensor 11 as illustrated in (b) in FIG. 8, controller 18 causes display 31 to display, on operation screen 230A, first gauge bar 301 having length D3 corresponding to length d3 of the first gesture that has been input. Note that length d3 is greater than length d2, and length D3 is greater than length D2.

Thus, in the case in FIG. 8, end portion 301a of first gauge bar 301 is located in first region 322 as in the case in FIG. 7, and thus controller 18 performs only the process of causing first gauge bar 301 having a length greater than in the case in FIG. 7 to be displayed. Furthermore, in this case, because end portion 301a of first gauge bar 301 has not moved to next first region 323, controller 18 does not vibrate actuator 19.

Next, the case where a user provides an input indicating confirmation in the state illustrated in FIG. 6 and then makes the second gesture upward will be described with reference to FIG. 9.

Note that although the user input indicating confirmation in the state in FIG. 6 is described as an input having a pressing force greater than a predetermined pressing force to pressure-sensitive sensor 12 as mentioned above, this input is not limiting. For example, the user input indicating confirmation may be defined as tapping on first touch sensor 11. Alternatively, making one gesture to continuously change the running direction of a finger from the gesture in FIG. 6, which is made along the first direction, to the gesture in FIG. 9, which is made along the second direction (substantially orthogonal to the first direction), may be defined as the user input indicating confirmation to first touch sensor 11.

When first inputter 10 receives an input indicating confirmation, controller 18 selects, from among the plurality of first icons 311a, 312 to 316, the first icon disposed in the first region where end portion 301a at the far end in the first direction (specifically, the right end) of first gauge bar 301 displayed on operation screen 230A of display 31 is located. Thus, in FIG. 9, first icon 311a is selected. Furthermore, when first icon 311a is selected, controller 18 may cause other first icons 312 to 316 to be grayed out while being displayed.

Figure 9:
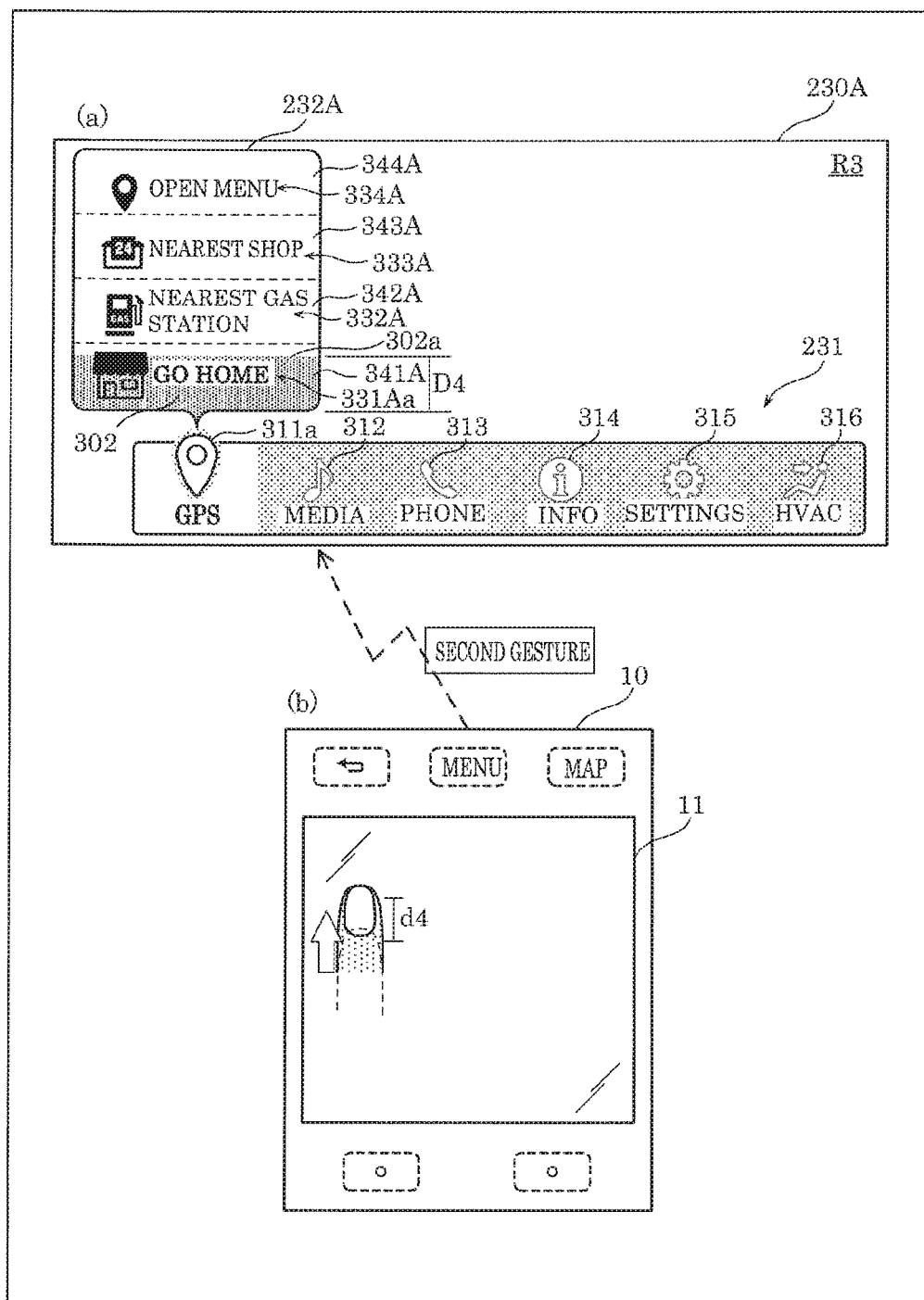
FIG. 9 is a diagram for describing a method for providing an input to each of a first menu and a second menu.

In FIG. 9, (a) is a diagram for describing first menu 231 and second menu 232A which are displayed on operation screen 230A according to the upward gesture input to first inputter 10. In FIG. 9, (b) is a diagram illustrating the input to first inputter 10.

When first icon 311a is selected, controller 18 causes second gauge bar 302 to be displayed on second menu 232A. When first touch sensor 11 receives the second gesture made vertically while second menu 232A is displayed on operation screen 230A of display 31, controller 18 causes display 31 to display, on operation screen 230A, second gauge bar 302 extending vertically from the second reference position, which serves as the origin, on second menu 232A. Specifically, controller 18 causes display 31 to display, on operation screen 230A, second gauge bar 302 having length D4 corresponding to length d4 of the second gesture vertically input to first touch sensor 11.

Here, the second reference position is the position of one end in a vertical direction, which is the lower end in the present embodiment, of second menu 232A. When the orientation of the second gesture corresponds to the second orientation (upward) from one end (lower end) to the other end (upper end) of second menu 232A, controller 18 causes display 31 to display, on operation screen 230A, second gauge bar 302 extending upward from the position of the lower end of second menu 232A which serves as the second reference position. Note that in (a) in FIG. 9, second gauge bar 302 is shown by dot hatching.

Controller 18 may cause second icon 331Aa, which is disposed in second region 341A where end portion 302a at the far end in the second direction (specifically, the upper end) of second gauge bar 302 displayed on operation screen 230A of display 31 is located, to be displayed highlighted. A specific example of displaying the highlighted second icon is substantially the same as a specific example of displaying the highlighted first icon.

Next, the case where a user has extended upward the second gesture in the state illustrated in FIG. 9 will be described with reference to FIG. 10.

Figure 10:
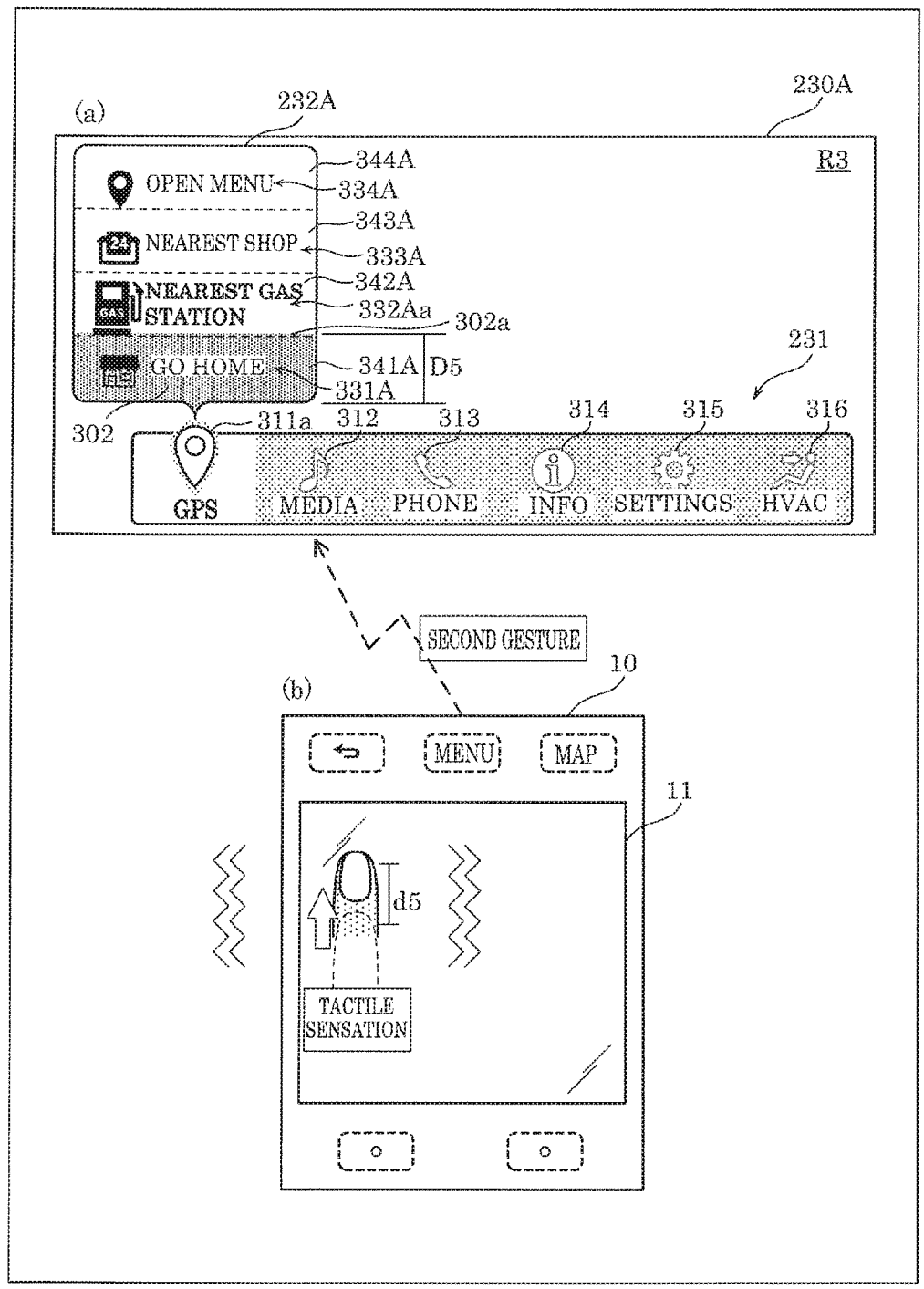
FIG. 10 is a diagram for describing a method for providing an input to each of a first menu and a second menu.

In FIG. 10, (a) is a diagram for describing first menu 231 and second menu 232A which are displayed on operation screen 230A according to the upward gesture input to first inputter 10. In FIG. 10, (b) is a diagram illustrating the input to first inputter 10.

Figure 14:
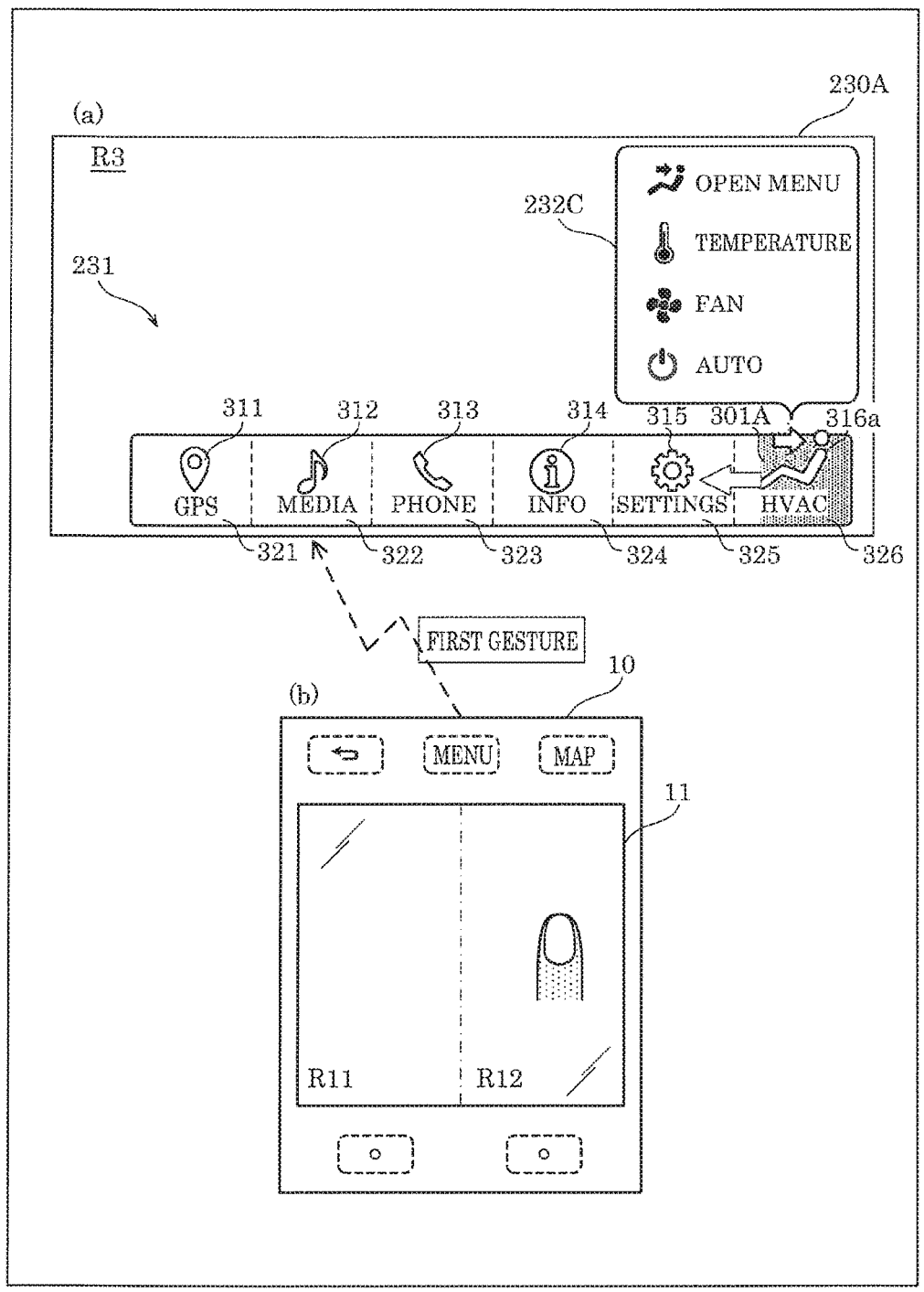
FIG. 14 is a diagram for describing the process of changing a first reference position according to the position of the origin of a gesture.

When the second gesture extended upward is input to first touch sensor 11 as illustrated in (b) in FIG. 14, controller 18 causes display 31 to display, on operation screen 230A, second gauge bar 302 having length D5 corresponding to length d5 of the second gesture that has been input. Note that length d5 is greater than length d4, and length D5 is greater than length D4.

Subsequently, when end portion 302a of second gauge bar 302 has moved from second region 341A to another second region 342A adjacent to second region 341A among the plurality of second regions 341A to 344A as a result of increasing the length of second gauge bar 302, as illustrated in (a) in FIG. 10, controller 18 focuses on second icon 332Aa disposed in second region 342A where end portion 302a is located. Thus, controller 18 displays highlighted second icon 332Aa.

Furthermore, when end portion 302a of second gauge bar 302 has moved from second region 341A to second region 342A, that is, when end portion 302a has moved across the boundary line between second region 341A and second region 342A, controller 18 vibrates actuator 19 to vibrate first touch sensor 11. Thus, controller 18 provides feedback of a tactile sensation to the user.

When first inputter 10 receives an input indicating confirmation, controller 18 selects, from among the plurality of second icons 331A, 332Aa, 333A, 334A, the second icon disposed in the second region where end portion 302a of second gauge bar 302 displayed on operation screen 230A of display 31 is located. For example, when first inputter 10 receives an input indicating confirmation in the state illustrated in (a) in FIG. 10, controller 18 selects second icon 332Aa. Subsequently, controller 18 performs the function indicated by second icon 323Aa that has been selected, and provides an indication that said function has been performed. Note that the input indicating confirmation here is also not limited to an input having a pressing force to pressure-sensitive sensor 12 and may be tapping or may be one continuous gesture in which the running direction is changed from the second direction to the first direction as mentioned above.

Furthermore, when first touch sensor 11 has not received any touch for the second length of time while second menu 232A is displayed on display 31, controller 18 may cause display 31 to delete the display of second menu 232A. In this case, controller 18 may cause display 31 to display first menu 231 only or may cause display 31 to delete the display of first menu 231.

Thus, when a user stops touching, controller 18 can cause the display of second menu 232A to be deleted, for example, leaving only first menu 231 as displayed. In other words, since a user makes the first gesture as the input to first menu 231 in the default state after a while, the length of the first gesture can be the same until the desired first icon is selected. Thus, a user can easily provide an accurate input to first menu 231.

Figure 11:
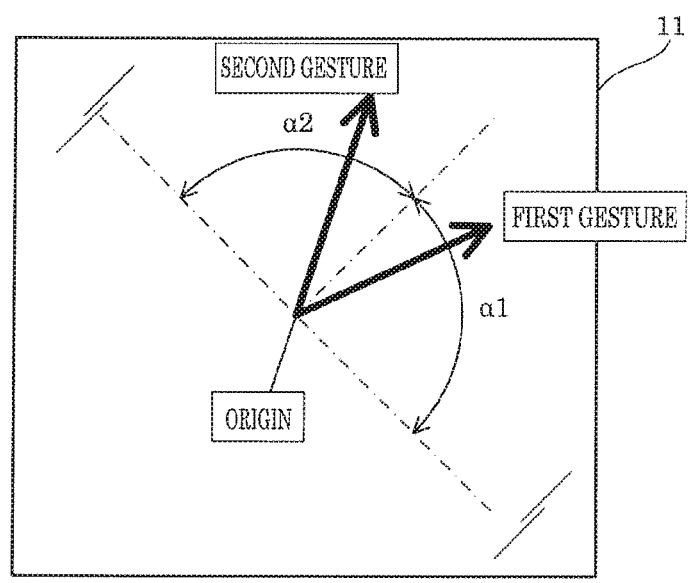
FIG. 11 is a diagram for describing an angle range in which a gesture on a first touch sensor is discerned.

Furthermore, controller 18 may recognize, as the first gesture, a gesture directed into first angle range α1 which is centered on the origin of the input to first touch sensor 11 and includes a horizontal direction, and recognize, as the second gesture, a gesture directed into second angle range α2 which is centered on the origin, is adjacent to first angle range α1, and includes a vertical direction, as illustrated in FIG. 11. Note that in FIG. 11, first angle range α1 for recognizing the first gesture is an angle range located to the right of the origin because the first gesture is directed to the right, but may be an angle range located to the left of the origin in the case where the first gesture is directed to the left. Similarly, second angle range α2 for recognizing the second gesture is an angle range located above the origin because the second gesture is directed upward, but may be an angle range located below the origin in the case where the second gesture is directed downward. Note that the direction of a gesture may be defined using the angle of a straight line connecting two points that are the origin and the point of the current input.

As just described, each of the first gesture and the second gesture can be discerned according to the angle of the gesture from the origin, and thus controller 18 can discern whether the gesture input by a user is the first gesture or the second gesture even when the gesture is not precisely horizontal or vertical. Thus, a user can easily input a gesture.

[3. Operations]

Next, the operations of input device 100 will be described with reference to FIG. 12 and FIG. 13.

Figure 12:
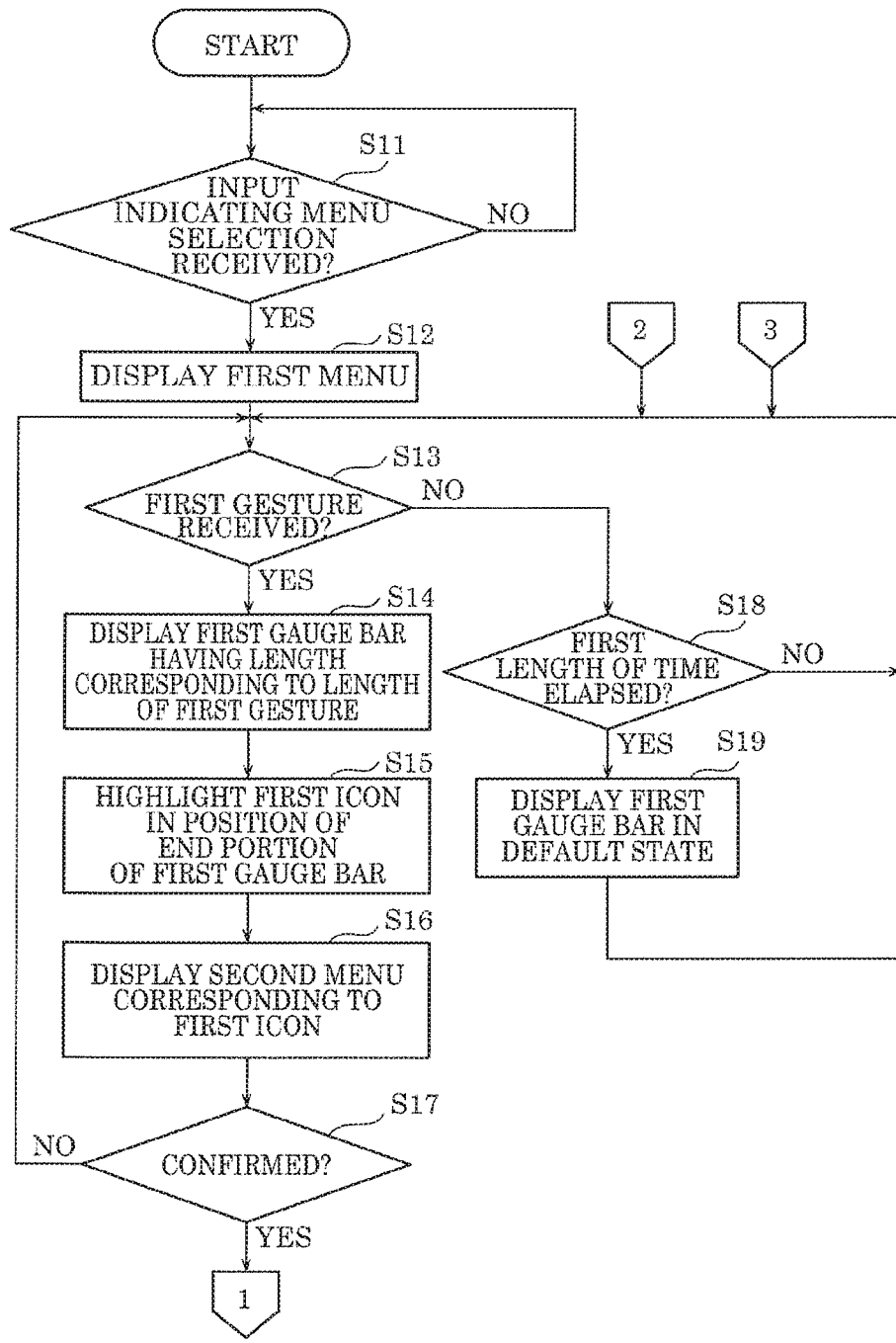
FIG. 12 is a flowchart illustrating one example of the operation of an input device according to an embodiment.
Figure 13:
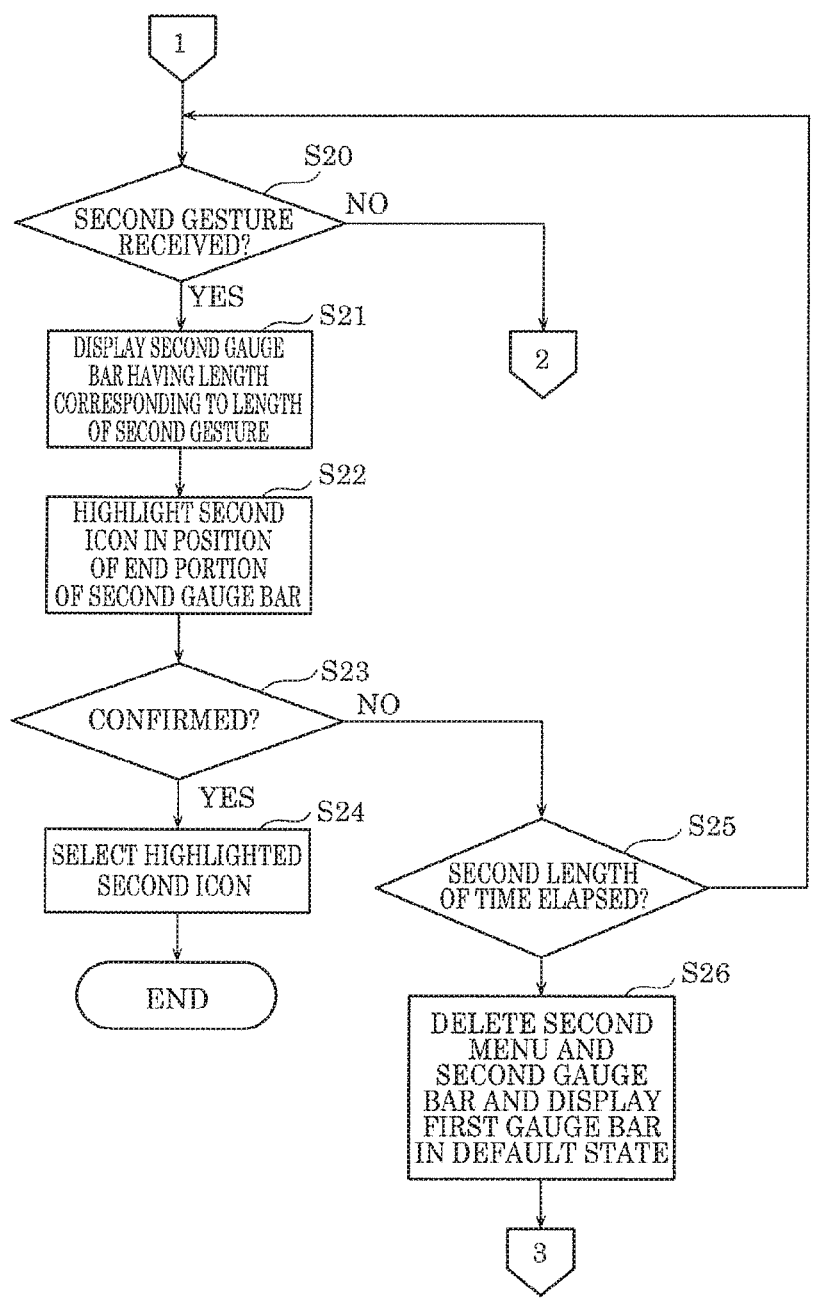
FIG. 13 is a flowchart illustrating one example of the operation of an input device according to an embodiment.

FIG. 12 and FIG. 13 are flowcharts each illustrating one example of the operation of the input device according to the embodiment.

Controller 18 determines whether or not an input indicating menus selection has been received (S11). The input indicating the menu selection is, for example, a touch of touch switch 14 of first inputter 10. In other words, controller 18 determines whether or not touch switch 14 has detected a touch, for example.

When the input indicating the menu selection has been received (YES in S11), controller 18 causes display 31 to display first menu 231 (S12).

On the either hand, when the input indicating the menu selection has not been received (NO in S11), controller 18 returns to Step S11 and repeats Step S11.

When first menu 231 is displayed, controller 18 determines whether or not first touch sensor 11 has received the first gesture (S13).

When first touch sensor 11 has received the first gesture (YES in S13), controller 18 displays, over first menu 231, first gauge bar 301 having a length corresponding to the length of the first gesture received by first touch sensor 11 (S14).

Next, controller 18 highlights the first icon disposed in the first region where end portion 301a of first gauge bar 301 is located (S15) and displays second menu 232A corresponding to the first icon (S16). Note that Steps S14 to S16 do not need to be performed in this sequence and may be performed at the same time.

Subsequently, controller 18 determines whether or not first inputter 10 has received an input indicating confirmation (S17). The input indicating confirmation is, for example, pressing with a pressing force greater than or equal to a predetermined pressing force on pressure-sensitive sensor 12 of first inputter 10.

When first inputter 10 has received the input indicating confirmation (YES in S17), controller 18 grays out the first icons other than the first icon that has been confirmed, and performs the next step, i.e., Step S20. Thus, controller 18 transitions to a mode for receiving the second gesture. On the other hand, when first inputter 10 has not received the input indicating confirmation (NO in S17), controller 18 returns to Step S13. Note that controller 18 does not need to make the determination in Step S17.

When first touch sensor 11 has not received the first gesture (NO in S13), controller 18 determines whether or not the first length of time has elapsed in the state where the first gesture has not been received (S18). Note that when the first gesture has been received once, the first length of time may be zero. In other words, controller 18 may detect transition from the state where the first gesture has been received to the state where the first gesture has not been received.

When determining the elapse of the first length of time in the state where the first gesture has not been received (YES in S18), controller 18 restores the length of first gauge bar 301 to the default (S19) and returns to Step S13.

When determining that the first length of time has not elapsed in the state where the first gesture has not been received (NO in S18), controller 18 repeats Step S13.

Next, controller 18 determines whether or not first touch sensor 11 has received the second gesture (S20).

When first touch sensor 11 has received the second gesture (YES in S20), controller 18 displays, over second menu 232A, second gauge bar 302 having a length corresponding to the length of the second gesture received by first touch sensor 11 (S21). When first touch sensor 11 has not received the second gesture (NO in S20), controller 18 returns to Step S13.

Next, controller 18 highlights the second icon disposed in the second region where end portion 302a of second gauge bar 302 is located (S22). Note that Steps S21 and S22 do not need to be performed in this sequence and may be performed at the same time.

Subsequently, controller 18 determines whether or not first inputter 10 has received an input indicating confirmation (S23).

When first inputter 10 has received the input indicating confirmation (YES in S23), controller 18 selects the second icon that is displayed highlighted, and performs the function indicated by the second icon (S24).

On the other hand, when first inputter 10 has not received the input indicating confirmation (NO in S23), controller 18 determines whether or not the second length of time has elapsed in the state where the second gesture has not been received (S25).

When determining the elapse of the second length of time in the state where the second gesture has not been received (YES in S25), controller 18 deletes the display of second menus 232A and second gauge bar 302 and restores the length of first gauge bar 301 to the default (S26). Subsequently, controller 18 returns to Step S13.

Note that each of the flowcharts illustrated in FIG. 12 and FIG. 13 is one example; the steps do not always need to be performed in the sequence indicated in each of FIG. 12 and FIG. 13 and it is not always necessary to perform all the steps as long as input device 100 performs the processes described in the Functional Configuration of Input Device section.

[4. Advantageous Effects, etc.]

Input device 100 according to the present embodiment includes first inputter 10 and controller 18 and provides an input for operating a user interface (UI) including first menu 231 and displayed by display 31 disposed in automobile 1. First inputter 10 includes first touch sensor 11 which receives a gesture made as a touch by a user. Controller 18 causes display 31 to display, as first menu 231, the plurality of first icons 311 to 316 horizontally aligned. Controller 18 causes display 31 to display first gauge bar 301 extending horizontally from the first reference position, which serves as the origin, on first menu 231 and having a length corresponding to the length of the first gesture horizontally input to first touch sensor 11. Furthermore, controller 18 selects, from among the plurality of first icons 311 to 316 respectively disposed in the plurality of first regions 321 to 326 seamlessly aligned, the first icon disposed in the first region where end portion 301a of first gauge bar 301 displayed on display 31 is located when the input indicating confirmation is provided to first inputter 10.

With this, there is a match between the alignment direction of the plurality of first icons 311 to 316 and the direction of the first gesture for adjusting the length of first gauge bar 301, and thus a user can intuitively select a desired first icon from among the plurality of first icons 311 to 316. Moreover, a user can adjust the length of first gauge bar 301 by merely adjusting the length of the first gesture, and therefore can easily adjust the position of end portion 301a of first gauge bar 301 opposite to the origin.

Furthermore, the plurality of first icons 311 to 316 are respectively disposed in the plurality of first regions 321 to 326 seamlessly aligned. Thus, if end portion 301a of first gauge bar 301 is located in the first region for the first icon different from the desired first icon, it is sufficient that a user make the first gesture to move end portion 301a of first gauge bar 301 toward the first region in which the desired first icon is disposed. Therefore, it is possible to swiftly move end portion 301a of first gauge bar 301 to the first region in which the desired first icon is disposed. Accordingly, a user can easily provide an accurate input to menus 231, 232A, 232B displayed on display 31 even when the user engages in another task such as driving.

Furthermore, in input device 100 according to the present embodiment, when first touch sensor 11 receives the second gesture made vertically while second menu 232A is displayed on display 31, controller 18 causes display 31 to display second gauge bar 302 extending vertically from the second reference position, which serves as the origin, on second menu 232A and having a length corresponding to the length of the second gesture. Subsequently, controller 18 selects, from among the plurality of second icons 331A to 334A respectively disposed in the plurality of second regions 341A to 344A seamlessly aligned, the second icon disposed in the second region where end portion 302a of second gauge bar 302 displayed on display 31 is located when the input indicating confirmation is provided to first inputter 10.

Accordingly, second gauge bar 302 can be displayed as a result of the second gesture made along a vertical direction substantially orthogonal to a horizontal direction and thus, even when second menu 232A is displayed, the input to first menu 231 and the input to second menu 232A can be discerned.

Furthermore, as with the case of the input to first menu 231, there is a match between the alignment direction of the plurality of second icons 331A to 334A and the direction of the second gesture for adjusting the length of second gauge bar 302, and thus a user can intuitively select a desired second icon from among the plurality of second icons 331A to 334A. Moreover, a user can adjust the length of second gauge bar 302 by merely adjusting the length of the second gesture, and therefore can easily adjust the position. of end portion 302a of second gauge bar 302 opposite to the origin.

Furthermore, the plurality of second icons 331A to 334A are respectively disposed in the plurality of second regions 341A to 344A seamlessly aligned. Thus, if end portion 302a of second gauge bar 302 is located in the second region for the second icon different from the desired second icon, it is sufficient that a user make the second gesture to move end portion 302a of the second gauge bar toward the second region in which the desired second icon is disposed; therefore, it is possible to swiftly move end portion 302a of second gauge bar 302 to the second region in which the desired second icon is disposed. Accordingly, a user can easily provide an accurate input to menus 231, 232A, 232B displayed on display 31 even when the user engages in another task such as driving.

[5. Variations]

In the above embodiment, controller 18 sets the first reference position to the position of the left end of first menu 231, but this is not limiting. When the position on first touch sensor 11 in which the origin of the first gesture has been received is closer to one end than to the other end of the detection region for the touch on first touch sensor 11 in a horizontal direction, controller 18 may set the first reference position to the position of one end of the first menu in the horizontal direction and cause display 31 to display the first gauge bar that extends from the one end to the other end in the first orientation. For example, as illustrated in FIG. 14, when the origin of the first gesture is input to region R12 which is the right half of the detection region of first touch sensor 11, first gauge bar 301A extending to the left from the right end of first menu 231 as the first reference position may be displayed.

This means that when the origin of the first gesture is input to region R12 of first touch sensor 11, the origin is detected in a position closer to the right end of the detection region of first touch sensor 11 than to the left end thereof in the horizontal direction. Therefore, controller 18 causes first gauge bar 301A having the first reference point at the right end of first menu 231. Furthermore, in this case, first icon 316a is focused on first, and second menu 232C corresponding to first icon 316a is displayed. Note that when the first gesture is input to right R11 which is the left half of the detection region of first touch sensor 11, first gauge bar 301 that is the same as or similar to that illustrated in FIG. 6 is displayed.

In this manner, according to the position in the detection region of first touch sensor 11 in which the origin of the first gesture has been received, controller 18 determines, as the first reference position on first menu 231, the end on the side near the position in which the origin has been received. Furthermore, controller 18 sets the direction in which first gauge bars 301, 301A extend from the first reference position to the direction to one of the both ends of the detection region in the first direction that is far from the position in which the origin has been received. Thus, controller 18 can set the length of the first gesture for adjusting the length of first gauge bars 301, 301A to at least a half of the length of the detection region in the first direction, allowing a user to easily adjust the length of the first gauge bar.

Furthermore, in the above embodiment and the present variation, controller 18 sets the first reference position to an end of first menu 231, but this is not limiting; controller 18 may set the first reference position to a position different from an end of first menu 231, for example, to the position of the center of first menu 231 in a horizontal direction. In this case, when the first gesture is directed to the right, controller 18 causes the first gauge bar extending to the right from the first reference position to be displayed, and when the first gesture is directed to the left, controller 18 causes the first gauge bar extending to the left from the first reference position to be displayed.

Furthermore, the first reference position may be determined according to the priorities of the plurality of first icons 311 to 316. For example, input device 100 includes a storage (not illustrated in the drawings) which stores priorities having different values respectively associated with the plurality of first icons 311 to 316, and when causing display 31 to display first gauge bar 301, controller 18 may set, to the first reference position, a position located in a region where the first icon having the highest priority stored in the storage is disposed. This allows a user to easily select the first icon having the highest priority.

Furthermore, when causing display 31 to display first menu 231, controller 18 may cause the plurality of first icons 311 to 316 to be displayed on a horizontal line in descending order of the priorities of the plurality of first icons 311 to 316 from the highest priority. For example, controller 18 may cause the plurality of first icons 311 to 316 to be displayed on a line from the left in descending order from the highest priority. This allows a user to reduce the length of the first gesture to be input to select the first icon that is frequently selected, for example. Accordingly, a user can reduce the time required to select the first icon and thus can easily select the first icon.

Furthermore, the above storage may store, as the priorities, the priorities of the plurality of first icons 311 to 316 that have been preset by a user. This allows a user to reduce the length of the first gesture to be input to select the first icon that is frequently selected. Accordingly, a user can reduce the time required to select the first icon and thus can easily select the first icon.

Furthermore, controller 18 may associate each of the plurality of first icons 311 to 316 with a priority that increases with increasing frequency of selection by a user during a predetermined period extending back from the current point in time, and update the priorities stored in the above storage using the associated priorities. This allows a user to reduce the length of the first gesture to be input to select the first icon that is frequently selected. Accordingly, a user can easily select the first icon.

Furthermore, the second reference position may be determined according to the priorities of the plurality of second icons 331A to 334A, 331B to 334B. For example, the above storage may store priorities having different values respectively associated with the plurality of second icons 331A to 334A, 331B to 334B. When causing display 31 to display second gauge bar 302, controller 18 may set, to the second reference position, a position located in a region where the second icon having the highest priority stored in the storage is disposed. This allows a user to easily select the second icon having the highest priority. Note that the following description exemplifies the case where controller 18 causes second menu 232A to be displayed. Description of the situation in which controller 18 causes second menu 232B to be displayed will be omitted because the description for second menu 232A can apply.

Furthermore, when causing display 31 to display second menu 232A, controller 18 may cause the plurality of second icons 331A to 334A to be displayed on a vertical line in descending order of the priorities of the plurality of second icons 331A to 334A from the highest priority. For example, controller 18 may cause the plurality of second icons 331A to 334A to be displayed. upward on a line in descending order from the highest priority. This allows a user to reduce the length of the second gesture to be input to select the second icon that is frequently selected, for example. Accordingly, a user can reduce the time required to select the second icon and thus can easily select the second icon.

Furthermore, the above storage may store, as the priorities, the priorities of the plurality of second icons 331A to 334A preset by a user. This allows a user to reduce the length of the second gesture to be input to select the second icon that is frequently selected. Accordingly, a user can reduce the time required to select the second icon and thus can easily select the second icon.

Furthermore, controller 18 may associate each of the plurality of second icons 331A to 334A with a priority that increases with increasing frequency of selection by a user during a predetermined period extending back from the current point in time, and update the priorities stored in the above storage using the associated priorities. This allows a user to reduce the length of the second gesture to be input to select the second icon that is frequently selected. Accordingly, a user can easily select the second icon.

Note that controller 18 may perform only one or both of the control for displaying the plurality of first icon 311 to 316 according to the priorities thereof and the control for displaying the plurality of second icons 331A to 334A according to the priorities thereof.

Furthermore, first region R1 and second region R2 are provided on display 31 in the above embodiment and variations, but it is also possible to provide only third region R3 without providing first region R1 or second region R2. Specifically, only operation screens 230, 230A may be displayed on display 31.

Furthermore, first menu 231 and second menu 232A to 232C are displayed in third region R3 in the above embodiment and variations, but may be displayed in a region different from third region R3 or may be displayed across two or more regions among first region R1, second region R2, and third region R3.

Furthermore, first menu 231 and second menus 232A to 232C are displayed over operation screen 230A in the above embodiment and variations, but only first menus 231 and second menus 232A to 232C may be displayed instead of operation screen 230A.

Furthermore, in the above embodiment and variations, the first direction is a horizontal direction, and the second direction is a vertical direction, but this is not limiting; the first direction may be a vertical direction, and the second direction may be a horizontal direction.

Furthermore, second menus 232A to 232C are displayed above first menu 231 in the above embodiment and variations, but second menus 232A to 232C may be displayed below first menu 231. Moreover, in the case where the plurality of first icons 311 to 316 in first menus 231 are displayed on a vertical line, second menus 232A to 232C may be displayed to the right or left of first menu 231.

Furthermore, controller 18 causes second gauge bar 302 to be displayed on second menu 232A when first icon 311a is selected as a result of an input indicating confirmation in the above embodiment and variations, but second gauge bar 302 may be displayed without an input indicating confirmation.

Furthermore, the input indicating confirmation is an input to pressure-sensitive sensor 12 in the above embodiment and variations, but this is not limiting; the input indicating confirmation may be tapping or double-tapping on first touch sensor 11 or may be a touch input to other touch switches 13 to 17.

First touch sensor 11 disposed in a position that is not on steering 50 of automobile 1 is used as a touch sensor in the above embodiment, but this is not limiting. For example, as illustrated in FIG. 15 and FIG. 16, input device 100A including second inputter 20 which includes second touch sensor 21 disposed on steering 50 of automobile 1A may be used.

Figure 15:
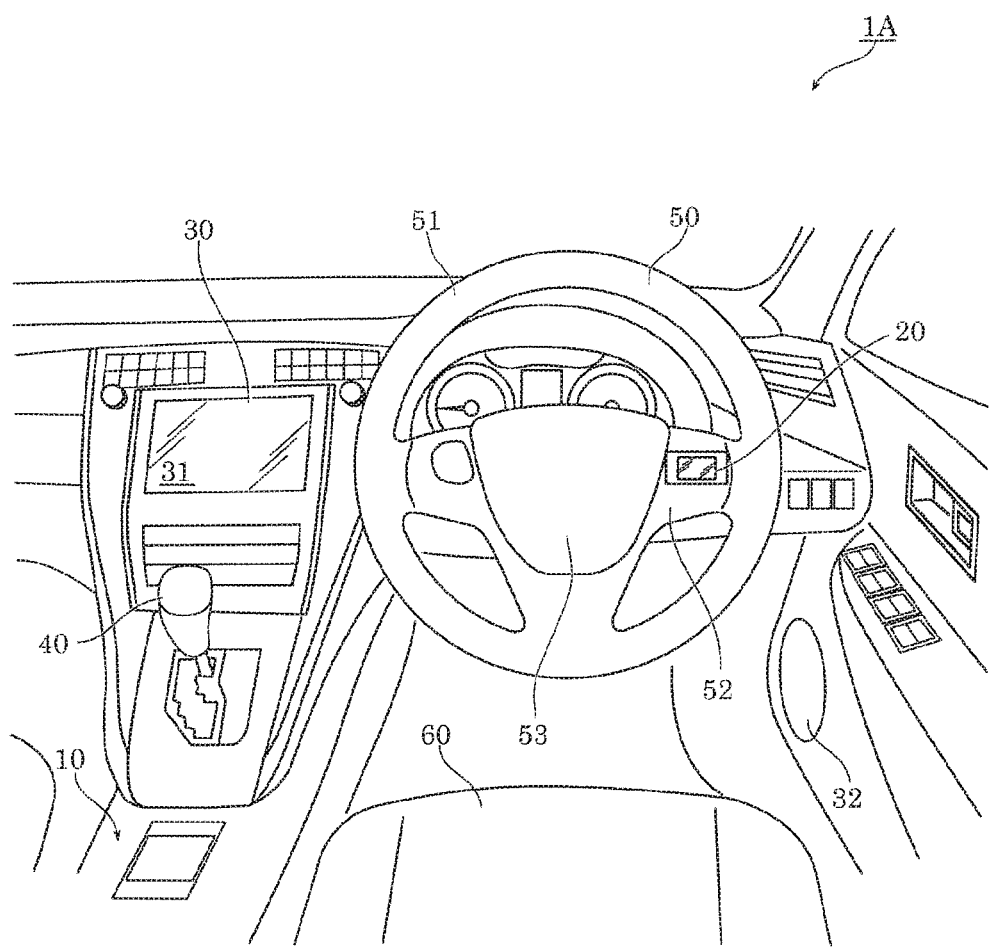
FIG. 15 is a diagram illustrating one example of an input device according to a variation and the configuration of the interior of a vehicle in which the input device is disposed.
Figure 16:
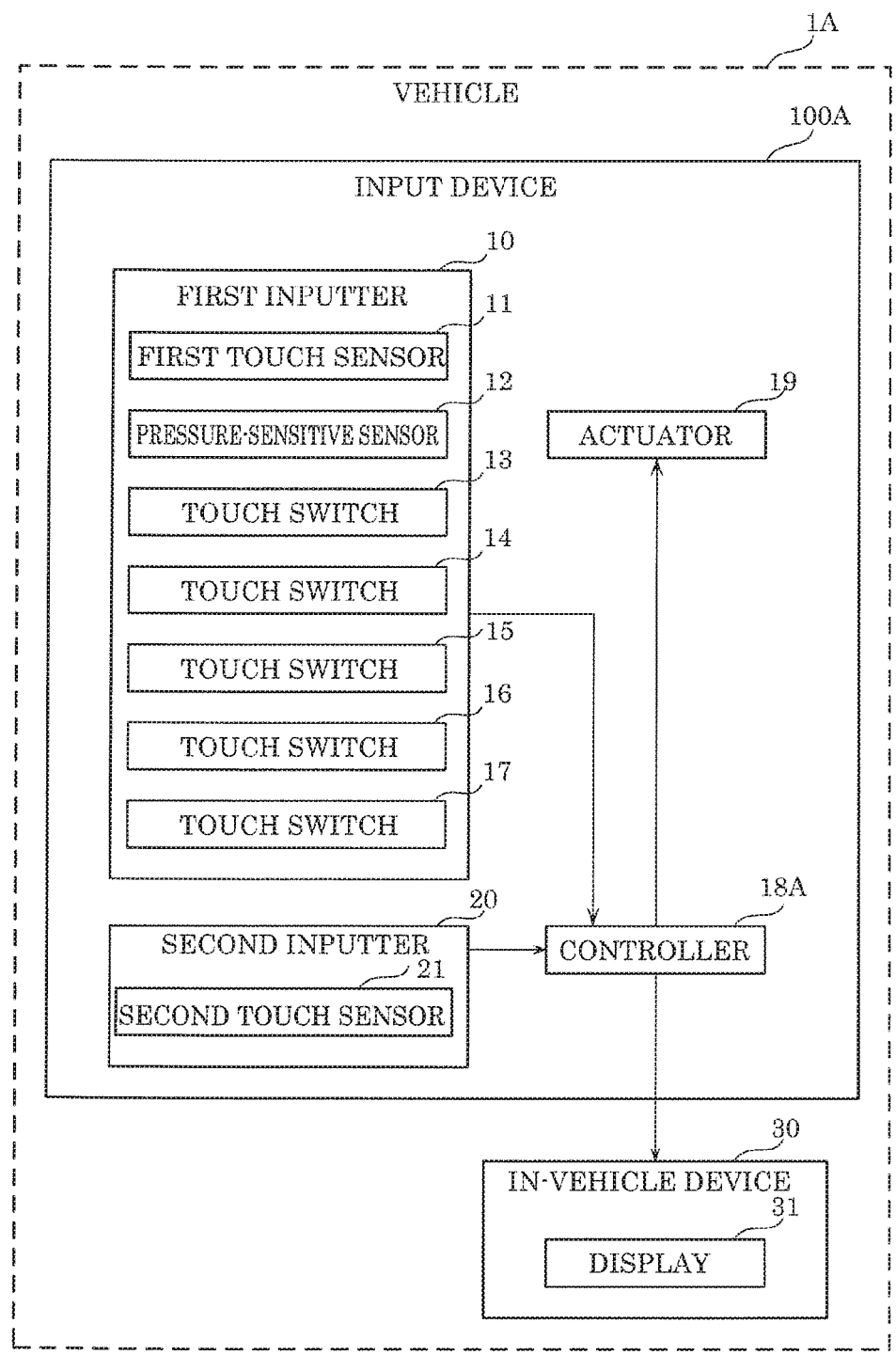
FIG. 16 is a block diagram illustrating one example of a functional configuration of an input device mounted on an automobile according to a variation.

FIG. 15 is a diagram illustrating one example of an input device according to a variation and the configuration of the interior of a vehicle in which the input device is disposed. FIG. 16 is a block diagram illustrating one example of a functional configuration of an input device mounted on an automobile according to a variation.

Input device 100A according to the variation is different from input device 100 according to the embodiment in only the configuration of second inputter 20 and the function of controller 18A; thus, the following describes second inputter 20 while omitting descriptions of the other configurations.

Second inputter 20 is disposed on steering 50. Second inputter 20 is a switch including second touch sensor 21. Second inputter 20 is disposed, for example, on spoke 52 of steering 50.

A driver can operate in-vehicle device 30 by providing an input to second inputter 20 with a finger of his or her right hand gripping rim 51 of steering 50.

Second touch sensor 21 detects the position of a touch with a user body portion (for example, a finger). When an input is provided to second touch sensor 21, an input signal indicating said input is output to controller 18A. Controller 18A may perform the operations described in the above embodiment according to a gesture on second touch sensor 21 instead of a gesture on first touch sensor 11.

Note that the display screen working with a touch input to second touch sensor 21 is not limited to the configuration displayed on display 31 and may be a configuration displayed, for example, on a display provided in a meter. In this case, the result of operating second touch sensor 21 by a driver while driving can be visually recognized with the minimum line-of-sight motion. Furthermore, the result of operating first touch sensor 11 may be displayed on the display in the meter.

Furthermore, both of first inputter 10 and second inputter 20 are included in the configuration illustrated in FIG. 15 and FIG. 16, but a configuration including second inputter 20 only is also applicable.

Each of input devices 100, 100A according to the above embodiment and variations is configured to not include display 31, but a configuration in which an input device includes display 31 is also applicable.

Note that in the above embodiment, each structural element may be configured using dedicated hardware or may be implemented by executing a software program appropriate for the structural element. Each structural element may be implemented as a result of a program execution unit such as a central processing unit (CPU) or processor reading and executing a software program recorded on a storage medium such as a hard disk or a semiconductor memory. Here, the software program for implementing the input device according to the above embodiment is the program described below.

Specifically, this program causes a computer to perform an input method, such is used by an input device that provides an input for operating a user interface (UI) including a first menu and displayed by a display disposed in a vehicle, and includes: causing the display to display, as the first menu, a plurality of first icons aligned in a first direction; causing the display to display a first gauge bar extending from a first reference position, which is used as an origin, on the first menu in the first direction and having a length corresponding to a length of a first gesture input to a sensor in the input device along the first direction as a touch by a user; and selecting, from among the plurality of first icons respectively disposed in a plurality of regions seamlessly aligned, a first icon disposed in a region where an end portion, which is opposite to the origin in the first direction, of the first gauge bar displayed on the display is located when an input indicating confirmation is provided to the sensor.

Although the input device and the input method according to one or more aspects of the present disclosure have been described thus far based on the embodiment, the present disclosure is not limited to the above embodiment. Various modifications of the above embodiment as well as embodiments resulting from combinations of structural elements in different exemplary embodiments that may be conceived by a person having ordinary skill in the art are intended to be included within the scope of one or more aspects of the present disclosure as long as these do not depart from the essence of the present disclosure.

While various embodiment and variations have been described herein above, it is to be appreciated that various changes in form and detail may be made without departing from the spirit and scope of the present disclosure as presently or hereafter claimed.

further Information about Technical Background of the Application

The disclosures of the following Japanese Patent Applications including specification, drawings and claims are incorporated herein by references on their entirety: PCT International Application No. PCT/JP2018/037204 filed on Oct. 4, 2018 and Japanese Patent Application No. 2017-235934 filed on Dec. 8, 2017.

INDUSTRIAL APPLICABILITY

The present disclosure is useful as an input device, an input method, etc., that enable an accurate input to be easily provided to a menu displayed on a display even when a user engages in another task.

What is claimed is:
1. An input device comprising:
a touch sensor disposed in the input device, the touch sensor configured to detect a gesture made as a touch by a user, and to output electrical signals indicative of changes on a display disposed in a vehicle separated from a user interface (UI) of the output device; and
a processor which causes the display to display a first menu in response to the detected gesture, wherein the first menu extends in a first direction, includes a plurality of regions that are adjacently aligned in the first direction, and includes a plurality of icons, each of the plurality of icons being disposed within each of the plurality of regions,
wherein the processor causes the display to display a first gauge bar,
wherein the first gauge bar is configured to be superimposed over one or more of the plurality of regions of the first menu based on a length of a first gesture input to the touch sensor along the first direction,
wherein the first gauge bar is configured to extend in the first direction from a first reference position on the first menu, the first reference position being an origin of the first gauge bar,
wherein the first gauge bar has an end portion that extends from the first reference position and overlaps one of the plurality of regions of the first menu, wherein a length of the first gauge bar is modified corresponding to a length of the first gesture input to the touch sensor in the input device along the first direction, wherein the length of the first gauge bar increases in length in the first direction while the first gesture input is being moved along the first direction, wherein the first gauge bar is displayed in a color different from a color of the plurality of regions of the first menu while the first gesture input is being moved along the first direction, wherein, when causing the display to display the first gauge bar, the processor causes one icon of the plurality of icons provided on the first menu to be superimposed over the end portion of the first gauge bar when the end portion of the first gauge bar overlaps a region of the first menu including the one icon, and wherein the processor selects the one icon that is superimposed over the end portion of the first gauge bar when an input indicating confirmation is provided to the touch sensor.

2. The input device according to claim 1, wherein the first reference position is at a first end of the first menu, the first end being located at the origin, and when an orientation of the first gesture corresponds to a first orientation from the first end to a second end of the first menu, the processor causes the display to display the first gauge bar that extends from the first reference position in the first orientation.

3. The input device according to claim 1, wherein when a position of the first gesture initially received on the touch sensor is closer to a first end than to a second end of a detection region for the touch on the touch sensor in the first direction, the processor sets the first reference position to a position of the first end of the first menu in the first direction and causes the display to display the first gauge bar that extends in a first orientation from the first end to the second end, and when the position of the first gesture initially received on the touch sensor is closer to the second end than to the first end, the processor sets the first reference position to a position of the second end of the first menu in the first direction and causes the display to display the first gauge bar that extends in a second orientation from the second end to the first end.

4. The input device according to claim 1, further comprising:

an actuator which provides a predetermined tactile sensation to the touch sensor, wherein when the end portion of the first gauge bar has moved from one of the plurality of regions to an adjacent region among the plurality of regions, the processor activates the actuator.

5. The input device according to claim 1, wherein after a lapse of a first length of time without the touch sensor having received the touch while the first gauge bar is displayed on the display, the processor causes the display to display the first gauge bar that has a length changed to at most a first width measured from the first reference position in the first direction.

6. The input device according to claim 1, wherein the processor causes the display to display a second menu corresponding to a plurality of sub-functions included in a function indicated by the superimposed icon in the region where the end portion of the first gauge bar is located, and the second menu includes a plurality of icons which respectively correspond to the plurality of sub-functions and are aligned in a second direction substantially orthogonal to the first direction.

7. The input device according to claim 6, wherein when the touch sensor receives a second gesture made along the second direction while the second menu is displayed on the display, the processor causes the display to display a second gauge bar extending from a second reference position on the second menu in the second direction and having a length corresponding to a length of the second gesture, the second reference position being used as an origin of the second gauge bar, and the processor selects, from among the plurality of icons of the second menu respectively disposed in a plurality of second regions adjacently aligned, an icon of the second menu disposed in a region overlapped by an end portion of the second gauge bar when an input indicating confirmation is provided to the touch sensor, the end portion of the second gauge bar being opposite to the origin of the second gauge bar in the second direction.

8. The input device according to claim 7, wherein when the second gauge bar is displayed on the display, the processor causes icons of the first menu except for the superimposed one icon that is located in the region overlapped by the end portion to be grayed out.

9. The input device according to claim 1, further comprising:

a memory which stores priorities having different values respectively associated with the plurality of icons of the first menu, wherein when causing the display to display the first gauge bar, the processor sets, to the first reference position, a position located in a region where an icon of the first menu having a highest priority among the priorities stored in the memory is disposed.

10. The input device according to claim 9, wherein when causing the display to display the first menu, the processor aligns the plurality of icons of the first menu in the first direction in descending order of the priorities of the plurality of icons of the first menu from the highest priority.

11. The input device according to claim 9, wherein the memory stores, as the priorities, priorities of the plurality of icons of the first menu that have been preset by a user.

12. The input device according to claim 9, wherein the processor associates each of the plurality of icons of the first menu with a priority that increases with increasing frequency of selection by the user during a predetermined period extending back from a current point in time, and updates the priorities stored in the memory using the priority associated.

13. The input device according to claim 1, wherein when the first gauge bar is displayed on the display, the processor causes the one icon to be superimposed highlighted.

14. The input device according to claim 8, further comprising:

a memory which stores priorities having different values respectively associated with the plurality of icons of the second menu, wherein when causing the display to display the second gauge bar, the processor sets, to the second reference position, a position located in a region where an icon of the second menu having a highest priority among the priorities associated with the plurality of icons of the second menu stored in the memory is disposed.

15. The input device according to claim 14, wherein
when causing the display to display the second menu, the processor aligns the plurality of icons of the second menu in the second direction in descending order of the priorities of the plurality of icons of the second menu from the highest priority.

16. The input device according to claim 14, wherein the memory stores, as the priorities, priorities of the plurality of icons of the second menu that have been preset by a user.

17. The input device according to claim 14, wherein
the processor associates each of the plurality of icons of the second menu with a priority that increases with increasing frequency of selection by the user during a predetermined period extending back from a current point in time, and updates the priorities stored in the memory using the priority associated.

18. The input device according to claim 7, wherein
when the second gauge bar is displayed on the display, the processor causes an icon of the second menu, which is disposed in a region where an end portion of the second gauge bar displayed on the display is located, to be highlighted, and
the end portion of the second gauge bar being opposite to the origin of the second gauge bar in the second direction.

19. An input method used by an input device, the input method comprising:
detecting, by a touch sensor disposed in the input device, a gesture made as a touch by user, and outputting electrical signals indicative of changes on a display disposed in a vehicle separated from a user interface (UI) of the input device; and
causing the display to display a first menu in response to the detected gesture, wherein the first menu extends in a first direction, includes a plurality of regions that are adjacently aligned in the first direction, and includes a plurality of icons, each of the plurality of icons being disposed within each of the plurality of regions, and
causing the display to display a first gauge bar,
wherein the first gauge bar is configured to be superimposed over one or more of the plurality of regions of the first menu based on a length of a first gesture input to the touch sensor along the first direction,
wherein the first gauge bar is configured to extend in the first direction from a first reference position on the first menu, the first reference position being an origin of the first gauge bar,
wherein the first gauge bar has an end portion that extends from the first reference position and overlaps one of the plurality of regions of the first menu,
wherein a length of the first gauge bar is modified corresponding to a length of the first gesture input to the touch sensor in the input device along the first direction,
wherein the length of the first gauge bar increases in length in the first direction while the first gesture input is being moved along the first direction,
wherein the first gauge bar is displayed in a color different from a color of the plurality of regions of the first menu while the first gesture input is being moved along the first direction,
wherein the input method further comprises:
causing one icon of the plurality of icons provided on the first menu to be superimposed over the end portion of the first gauge bar when the end portion of the first gauge bar overlaps a region of the first menu including the one icon, and
selecting the one icon that is superimposed over the end portion of the first gauge bar when an input indicating confirmation is provided to the touch sensor.

* * * * *